(12) United States Patent
Suwa

(10) Patent No.: US 9,557,203 B2
(45) Date of Patent: Jan. 31, 2017

(54) SIMULATION METHOD AND SIMULATION APPARATUS

(71) Applicant: FUJITSU LIMITED, Kawasaki-shi, Kanagawa (JP)

(72) Inventor: Tamon Suwa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 835 days.

(21) Appl. No.: 13/967,468

(22) Filed: Aug. 15, 2013

(65) Prior Publication Data

US 2014/0114588 A1 Apr. 24, 2014

(30) Foreign Application Priority Data

Oct. 18, 2012 (JP) ................................ 2012-231224

(51) Int. Cl.
*G06G 7/48* (2006.01)
*G06G 7/50* (2006.01)
*G01F 1/76* (2006.01)

(52) U.S. Cl.
CPC ..................... *G01F 1/76* (2013.01)

(58) Field of Classification Search
CPC ....................................... G01F 1/76
USPC ....................................... 703/2, 9
See application file for complete search history.

(56) References Cited

U.S. PATENT DOCUMENTS

| 7,349,832 B2* | 3/2008 | Anderson | G06F 17/5009 345/473 |
| 8,368,688 B2* | 2/2013 | Chang | G06T 13/60 345/419 |
| 8,878,856 B1* | 11/2014 | Chentanez | G06T 13/00 345/473 |
| 8,935,135 B2* | 1/2015 | Ishikawa | G06F 17/5009 703/2 |

FOREIGN PATENT DOCUMENTS

| JP | 2004-219237 | 8/2004 |
| JP | 2005-115701 | 4/2005 |
| JP | 2008-089316 | 4/2008 |
| JP | 2010-054460 | 3/2010 |

OTHER PUBLICATIONS

Gesteira et al. "User Guide for the SPHysics code". Sep. 2010. 106 Pages.*
J. J. Monaghan, "Smoothed Particle Hydrodynamics", Annu. Rev. Astron. Astrophys., vol. 30, 1992, pp. 543-574.
F. Imamura et al., "Tsunami Modelling Manual (TUNAMI model)", "Numerical method of tsunami simulation with the leap-frog scheme (IUGG/IOC Time Project)", IOC Manual, UNESCO, No. 35, Apr. 2006, pp. 6-16.

(Continued)

*Primary Examiner* — Eunhee Kim
(74) *Attorney, Agent, or Firm* — Fujitsu Patent Center

(57) ABSTRACT

A computer is caused to execute processes of: calculating a flow rate and a water level of a continuum at each point on a two-dimensional plane in a first region, on the basis of input data; expressing the continuum in a second region (Continued)

contained in the first region as an assembly of particles, and subjecting the state of the each particle to a three-dimensional analysis based on the calculated flow rate and water level.

8 Claims, 13 Drawing Sheets

(56) References Cited

OTHER PUBLICATIONS

C. Kassiotis et al., "Coupling SPH with a 1-D Boussinesq-type wave model" http://hal.inria.fr/docs/00/60/13/52/PDF/KassiotisEtAl_Spheric6.pdf. 6th international SPHERIC workshop, Jun. 8-10, 2011.

Japanese Office Action mailed Aug. 9, 2016 for corresponding Japanese Patent Application No. 2012-231224, with Partial English Translation, 3 pages.

Ikari, Hiroyuki et al., "Hybridization of Particle Method and Boussinesq Model for Three-Dimensional Numerical Wave Tank", Annual Journal of Coastal Engineering, JSCE, vol. 53, pp. 11-15, with Partial English Translation, 2006.

* cited by examiner

SIMULATION METHOD AND SIMULATION APPARATUS

CROSS-REFERENCE TO RELATED APPLICATION

This application is based upon and claims the benefit of priority of the prior Japanese Patent Application No. 2012-231224, filed on Oct. 18, 2012, the entire contents of which are incorporated herein by reference.

FIELD

The embodiments discussed herein are directed to simulation methods and simulation apparatuses.

BACKGROUND

For analyzing movement of a continuum to investigate a fluid such as water or air by the use of a numerical calculation, that is, fluid analysis, there has been conventionally proposed a technique called particle method. Specifically, the particle method is intended to analyze motion of a continuum as motion of a finite number of particles. The currently proposed typical particle methods include SPH (smoothed particles hydrodynamics) method and MPS (moving particles semi-implicit) method. In the following description, a type of fluid such as water or air may be called "continuum" (for example, see J. J. Monaghan, "Smoothed Particle Hydrodynamics," Annu. Rev. Astron. Astrophys., Vol. 30, pp. 543 to 574).

In the particle methods, there has been conventionally known a standard approach by which a region for a subject particle (hereinafter, called "influence domain") is preset and interaction between the subject particle and only a counterpart particle existing in the influence domain is calculated to determine a force applied to the subject particle.

Expressing a continuum using the SPH method is characterized by smoothing and approximating physical quantities of a plurality of particles by the use of a weighting function called kernel function to discretize a basic equation. The smoothing process eliminates the need for performing extremely complicated calculations in mesh operation by which the physical quantities are evaluated on mesh points. Thus, the SPH method can be said to be suitable for dealing with free surface problems and multi-physics problems. Specifically, the SPH method can be said to be suitable for estimating the flow rate and impact pressure of sea waves colliding and overtopping shore protections, for example.

However, performing wide-range calculations by the SPH method results in a too large calculation amount. Thus, when the SPH method is used, calculations are to be performed only in a limited region of several km square at a maximum. Accordingly, with regard to propagation of tsunami waves, it is difficult to handle, by the SPH method, a process of propagation of sea waves from a source of tsunami located immediately on an earthquake center over several hundred km or more to be used in a tsunami calculation.

In addition, there is a conventional technique for conducting simulation of a fluid with a combination of topographic data and structural data (for example, see Japanese Laid-open Patent Publication No. 2005-115701). However, it is also difficult to handle, by this method, a wide range of several hundred km.

Meanwhile, there have been suggested conventional techniques for calculating a process of a tsunami from crustal deformation due to an earthquake through occurrence of a tsunami to the propagation of the tsunami from the earthquake center to the seashore by a two-dimensional propagation simulator (for example, see Japanese Laid-open Patent Publication No. 2008-089316 and Japanese Laid-open Patent Publication No. 2010-054460 and Goto, C., Ogawa, Y., Shuto, N., and Imamura, F.: Numerical method of tsunami simulation with the leap-frog scheme (IUGG/IOC Time Project), IOC Manual, UNESCO, No. 35, 1997, pp. 6 to 16). In the foregoing methods, information such as a wave height and a speed is set at each of points on a two-dimensional map, and it is possible to predict the wave height on the coast, flooded areas, and the like at occurrence of a tsunami.

There have been also proposed conventional techniques by which results of calculations in a lower dimension are given as initial conditions and boundary conditions for calculations in a higher dimension. For example, in one of the conventional techniques, an applied earthquake center and a vibration-receiving structure are treated by a three-dimensional finite element method, and vibrations transferred from the earthquake center to the structure through the ground are determined in a simplified model (for example, see Japanese Laid-open Patent Publication No. 2004-219237). In another conventional technique, a one-dimensional Boussinesq wave model and two-dimensional SPH method calculations are combined (for example, see Kassiotis et al., "Coupling SPH with a 1-D Boussinesq-type wave model". In the conventional technique in which a one-dimensional Boussinesq wave model and two-dimensional SPH method calculations are combined, a process is performed as described below, for example. Specifically, a buffer region is set as a region in which a region for performing calculations by the SPH method and a region for performing calculations by the Boussinesq method are overlapped; in the buffer region, a speed obtained as a result of the calculations by the Boussinesq method is forcedly set to each of particles treated by the SPH method; and outside the buffer region, the speed is updated according to an acceleration obtained by solving a fluid equation of motion. However, the buffer region is predetermined and SPH particles are not generated or eliminated.

However, the conventional technique using only two-dimensional simulation have problems, in which it is difficult to handle complicated landforms in port areas and the like for which three-dimensional characteristics are important, and in which it is difficult to calculate wave pressure and wave power applied to architectural structures.

In addition, the conventional technique, by which an applied earthquake center and a vibration-receiving structure are treated by a three-dimensional finite element method and vibrations transferred from the earthquake center to the structure through the ground are determined in a simplified model, is to be applied to vibrations through the ground and thus is difficult to be used for tsunami simulation.

Further, in the conventional technique by which a Boussinesq wave model is used for calculations by the SPH method, in the case where a large amount of fluid moves as in a tsunami, when the buffer region is narrow, all of the particles in the buffer region moves to the SPH region. Consequently, calculations in the buffer region may be disabled. On the other hand, when the width of the buffer region is decided taking into account of the movement of a fluid in a tsunami, the buffer region becomes too large to be actually processed, with an extreme increase in the calculation amount and memory amount thus caused. Moreover, the conventional technique is intended for a combination of one dimension and two dimensions, not a combination of two dimensions and three dimensions, and thus is difficult to be used for calculations of tsunami propagation.

SUMMARY

According to an aspect of an embodiment, a computer-readable recording medium has stored therein a simulation program causing a computer to execute a process which includes calculating a flow rate and a water level of a continuum at each point on a two-dimensional plane in a first region, on the basis of input data; expressing the continuum in a second region contained in the first region as an assembly of particles; and subjecting a state of the each particle to a three-dimensional analysis based on the calculated flow rate and water level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The simulation program, the simulation method, and the simulation apparatus disclosed herein are not limited by the following embodiments. Although, in the following description, simulation for analyzing motion of sea water at occurrence of a tsunami is exemplified, each of the embodiments can be applied to any simulation for analyzing motion of a continuum. In particular, the embodiments are preferably applied to simulation with a large quantity of movement of a continuum as in a tsunami.

[a] First Embodiment

Figure 1:
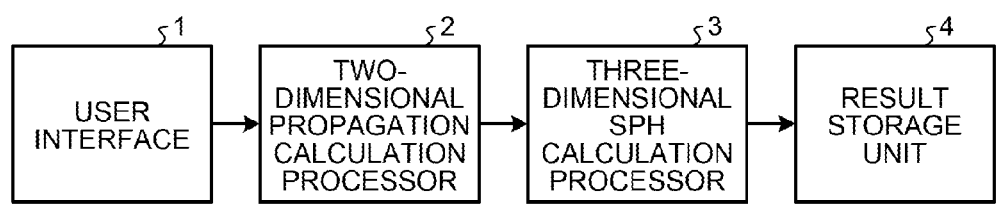
FIG. 1 is a block diagram of a simulation apparatus according to a first embodiment.

FIG. 1 is a block diagram of a simulation apparatus according to a first embodiment. As illustrated in FIG. 1, the simulation apparatus according to the first embodiment has an user interface 1, a two-dimensional propagation calculation processor 2, a three-dimensional SPH calculation processor 3, and a result storage unit 4.

The user interface 1 is an interface device that inputs numerical values from an operator using the simulation apparatus and outputs simulation results to the operator. Specifically, the user interface 1 is an input device such as a keyboard and an output device such as a display device.

Figure 2:
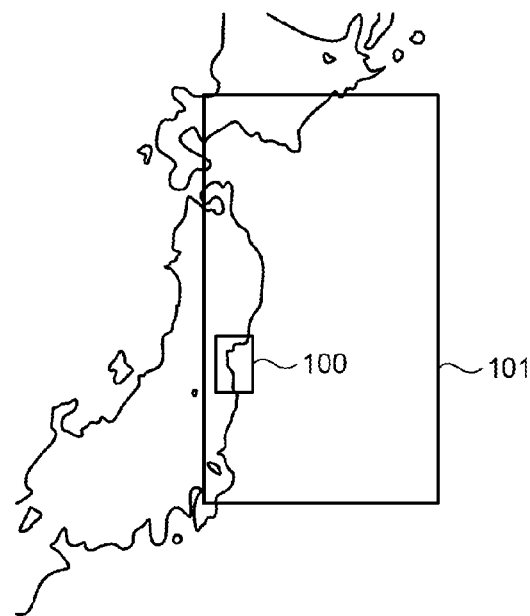
FIG. 2 is a diagram illustrating an example of a region in which a two-dimensional propagation calculation and a three-dimensional particle method calculation are carried out.

The operator uses the user interface 1 to set a region 100 and a region 101 as illustrated in FIG. 2, for example. FIG. 2 is a diagram illustrating regions in which a two-dimensional propagation calculation and a three-dimensional particle method calculation are carried out. The region 101 is a region in which two-dimensional propagation calculation is carried out as described later. The region 101 corresponds to an example of a "first region." The region 100 is a region in which three-dimensional particle method calculations are carried out as described later. The region 100 corresponds to an example of a "second region." As in the foregoing, the two-dimensional propagation calculation for determining the flow rate and water level of a continuum at each point on a two-dimensional plane is carried out on a larger region, and the three-dimensional SPH calculation is carried out on a smaller region including three-dimensionally complicated structures such as coastal areas. In this arrangement, the boundary between the region 100 and the region 101 is preferably located in a place with a certain degree of water depth. This is because, with a smaller water depth, the flow of sea water is prone to be under influence of the sea bottom and the coast, and thus the two-dimensional propagation calculation is carried out with lower accuracy. To use a result of the two-dimensional propagation calculation in the three-dimensional particle method calculation, the accuracy of the two-dimensional propagation calculation is preferably at the same level as the accuracy of the three-dimensional SPH calculation. Thus, the boundary is preferably set at a point with a certain degree of water depth. Specifically, the boundary is preferably set at a point with a water depth of 30 to 50 m, for example.

The operator then inputs initial data. In the embodiment, a two-dimensional plane as a planar view of the region 101 in FIG. 2 is divided into predetermined sections of a grid. In the two-dimensional propagation calculation, the motion of sea water in the divided sections of the grid is analyzed. The initial data here refers to initial values of water level $\eta$, flow rate M in x direction (hereinafter, also simply called "flow rate M") and a flow rate N in y direction (hereinafter, also simply called "flow rate N") in each of the divided sections of the grid, at x and y coordinates indicating the region 101. The water level $\eta$ here refers to an amount of increase in water level compared to a still water surface. The flow rate here refers to a product of a speed and an overall water depth, and the flow rate M in x direction is expressed as M=$v_x$×D ($v_x$ refers to a speed in x direction, D refers to an overall water depth, and D=water level η+still water depth h). The flow rate N in y direction is expressed as N=$v_y$×D ($v_y$ refers to a speed in y direction). The speed can be obtained from the overall water depth and the flow rate, and in reverse, the flow rate can be obtained from the overall water depth and the speed. Accordingly, it can be assumed that the flow rate and the speed virtually contain equivalent information. In the two-dimensional propagation calculation, the flow rate is used for ease of handling, whereas in the three-dimensional particle method calculation, the speed is easier to handle and thus the flow rate information is allowed to be converted into a speed. The speed obtained by combining the speed $v_x$ and the speed $v_y$ is a speed in each section of the grid.

The two-dimensional propagation calculation processor 2 uses the input initial values of the water level η, the flow rate M, and the flow rate N to calculate the water level η, the flow rate M, and the flow rate N in each section of the grid at the next step. The two-dimensional propagation calculation processor 2 further calculates sequentially the water level η, the flow rate M, and the flow rate N in each section of the grid at each step. The two-dimensional propagation calculation processor 2 repeats the calculation of the water level η, the flow rate M, and the flow rate N in each section of the grid at each step until reaching a final step as a preset final state. The step in the preset final state falls under a "first predetermined step." In the first embodiment, the final state is set at a point of time when a tsunami has reached the deepest part of the land and started to ebb.

Then, the two-dimensional propagation calculation processor 2 outputs data on the calculated water level η, the flow rate M, and the flow rate N in each section of the grid at each step, to the three-dimensional SPH calculation processor 3.

The three-dimensional SPH calculation processor 3 receives an input of the data on the water level η, the flow rate M, and the flow rate N in each section of the grid at each step, from the two-dimensional propagation calculation processor 2.

Then, the three-dimensional SPH calculation processor 3, out of the received data on the water level η, the flow rate M, and the flow rate N in each section of the grid at each step, identifies a step of the earliest time having data meeting a condition for starting the three-dimensional particle method calculation. For example, the three-dimensional SPH calculation processor 3 stores a point of time when the water level η at the boundary in the region 100 illustrated in FIG. 2 has exceeded 50 cm, as a condition for starting the three-dimensional particle method calculation.

The three-dimensional SPH calculation processor 3 uses the water level η in each section of the grid at the identified step of starting the three-dimensional particle method calculation to arrange the particles according to the water depth in the region 100 at that point of time. The water depth here refers to a distance from the top expressed as the water level η to the sea bottom. The particles may have any size but preferably have a diameter of 10 cm to 1 m. With the smaller particle diameter, analysis can be conducted with higher accuracy but the calculation amount increases, whereas with the larger particle diameter, the calculation amount decreases but the accuracy of the analysis becomes lower. Thus, the size of the particles is preferably decided according to usable calculation resources and supplied accuracy. The particles are obtained by modeling a fluid, and data needed for expressing the particles includes central coordinates, a speed, an influence radius, a density, a mass, viscosity, and the like. Of the foregoing data factors, the three-dimensional SPH calculation processor 3 stores, in advance, the influence radius, the mass, the viscosity, and the like.

The three-dimensional SPH calculation processor 3 further determines a speed $v_0$ as an initial value of a speed of each particle, from the flow rate M and the flow rate N in each section of the grid at the step for starting the three-dimensional particle method calculation. In this arrangement, "v" represents a vector indicating the speed of the particle. The three-dimensional SPH calculation processor 3 also determines a position $r_0$ as an initial value of position coordinates of each particle based on position of each section of the grid. In this arrangement, "r" represents a positional vector indicating the position of the particle. The three-dimensional SPH calculation processor 3 further uses a general pressure and a density of sea water as a pressure $P_0$ and a density $\rho_0$, which are initial values of the pressure and the density.

The three-dimensional SPH calculation processor 3 then uses the speed $v_0$, the position $r_0$, the pressure $P_0$, and the density $\rho_0$ to determine a speed v, a position r, a pressure P, and a density ρ of each particle at the next step. At that time, the three-dimensional SPH calculation processor 3 stores the extent of a specific distance Δx from the boundary in the region 100 illustrated in FIG. 2, as a boundary region. Then, when calculating the speed v, the position r, the pressure P, and the density ρ at each step, the three-dimensional SPH calculation processor 3 determines boundary conditions such as the speed v of the particle in the boundary region, from the received data on the flow rate M and the flow rate N in each section of the grid at each step. In this arrangement, the steps of conducting the three-dimensional particle method calculation are finer than the steps of conducting the two-dimensional propagation calculation. Accordingly, the three-dimensional SPH calculation processor 3 determines the boundary conditions while interpolating the flow rate M and the flow rate N to be used as boundary conditions.

As in the foregoing, the three-dimensional SPH calculation processor 3 repeats the calculation of the speed v, the position r, the pressure P, and the density ρ of each particle at each step until the preset final state is reached. The step at which the preset final state is reached corresponds to a "second predetermined step." In the first embodiment, the final state is set at a point of time when a tsunami has reached the deepest part of the land and started to ebb in the region 100.

The three-dimensional SPH calculation processor 3 then outputs data on the calculated speed v, position r, pressure P, and density ρ of each particle at each step, to the result storage unit 4.

The result storage unit 4 stores the speed v, position r, pressure P, and density ρ of each particle at each step, as analysis results received from the three-dimensional SPH calculation processor 3, in a memory, a hard disc, or the like.

Figure 3:
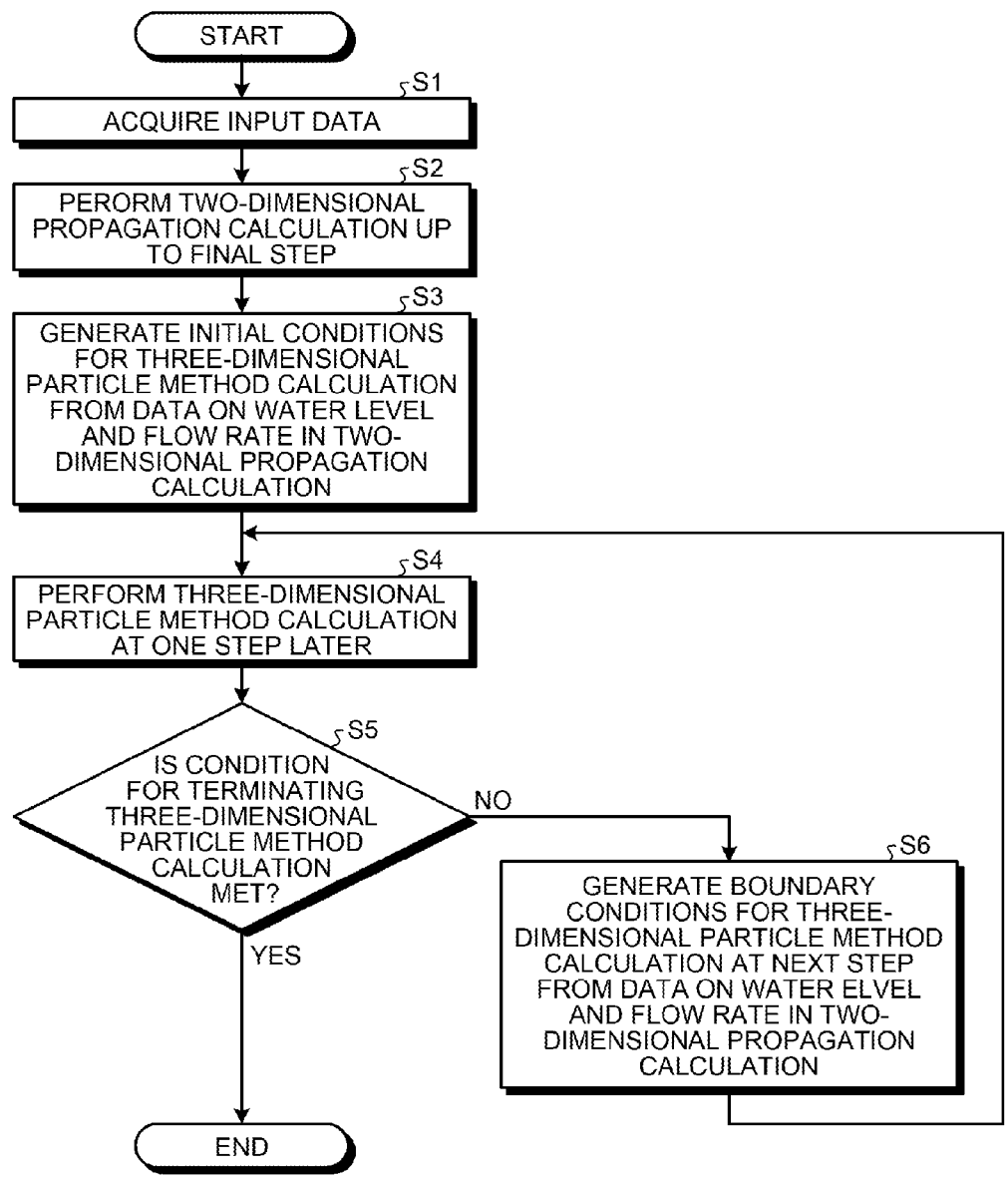
FIG. 3 is a flowchart of an analysis process performed by the simulation apparatus according to the first embodiment.

Next, a flow of an analysis process according to the first embodiment will be described with reference to FIG. 3. FIG. 3 is a flowchart of the analysis process performed by the simulation apparatus according to the first embodiment.

The two-dimensional propagation calculation processor 2 acquires the initial values of the water level η, the flow rate in the x direction M, and the flow rate in the y direction N in each section of the grid, which are the data input through the user interface 1 (step S1).

The two-dimensional propagation calculation processor 2 uses the initial values of the water level η, the flow rate in the x direction M, and the flow rate in the y direction N to execute the two-dimensional propagation calculation at each step until the final step is reached (step S2).

The three-dimensional SPH calculation processor 3 receives an input of the water level η, the flow rate in the x direction M, and the flow rate in the y direction N in each section of the grid at each step, from the two-dimensional propagation calculation processor 2. Next, the three-dimensional SPH calculation processor 3 identifies the step of starting the three-dimensional particle method calculation. Then, the three-dimensional SPH calculation processor 3 generates initial conditions for the three-dimensional particle method calculation, from the water level η, the flow rate in the x direction M, and the flow rate in the y direction N for the two-dimensional propagation calculation at the identified step (step S3).

The three-dimensional SPH calculation processor 3 uses the speed v, the position r, the pressure P, and the density ρ at the current step to perform the three-dimensional particle method calculation at one step later and to calculate the speed v, the position r, the pressure P, and the density ρ at the next step (step S4).

The three-dimensional SPH calculation processor 3 determines whether termination condition(s) for the three-dimensional particle method calculation are met (step S5). If the termination condition(s) are not met (step S5: No), the three-dimensional SPH calculation processor 3 generates boundary conditions at the next step, from the data on the water level η, the flow rate in the x direction M, and the flow rate in the y direction N for the two-dimensional propagation calculation in each section of the grid received from the two-dimensional propagation calculation processor 2 (step S6). After that, the three-dimensional SPH calculation processor 3 returns to step S4.

On the other hand, when the termination condition(s) are met (step S5: Yes), the three-dimensional SPH calculation processor 3 stores the analysis results in the result storage unit 4 and terminates the analysis process.

As described above, in the simulation on a wide-range movement of a continuum, the simulation apparatus according to the first embodiment performs the two-dimensional propagation calculation in wider areas and performs the three-dimensional particle method calculation in regions under great influence of three-dimensional land shapes such as port areas and urban areas. Accordingly, it is possible to perform a calculation without a failure for an event with a movement of a large amount of fluid such as a tsunami, and conduct a simulation with high accuracy while suppressing an increase of calculation amount.

[b] Second Embodiment

Next, a second embodiment will be described. A simulation apparatus according to the embodiment is identical to that in the first embodiment in the overall processes performed by the simulation apparatus. However, the second embodiment includes specific methods of performing the processes. Thus, the processes for a two-dimensional propagation calculation and a three-dimensional particle method calculation will be mainly described below. It is assumed that, in the simulation apparatus in the second embodiment, the components with the same reference numerals as those illustrated in FIG. 1 have the same functions as those illustrated in FIG. 1, unless otherwise specified in the following description.

Figure 4:
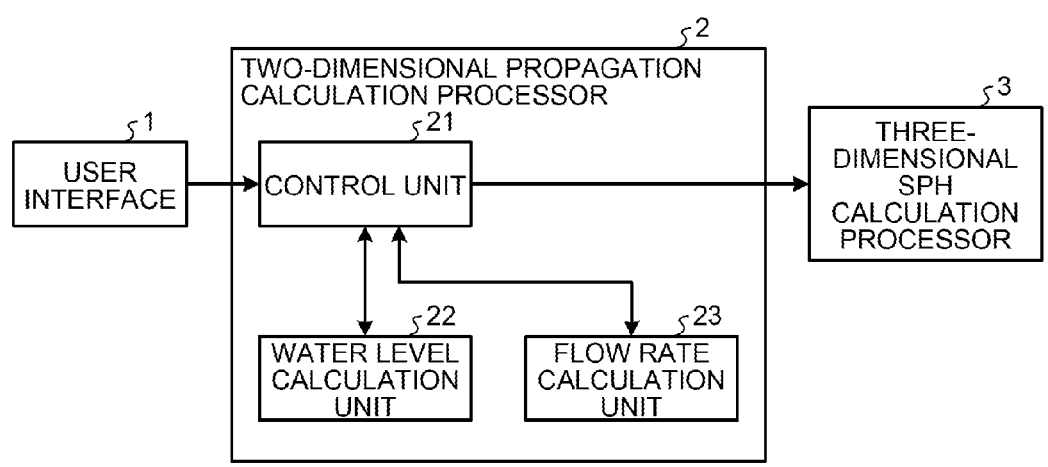
FIG. 4 is a block diagram of a two-dimensional propagation calculation preprocessor according to a second embodiment.

FIG. 4 is a block diagram of a two-dimensional propagation calculation preprocessor according to the second embodiment. As illustrated in FIG. 4, a two-dimensional propagation calculation processor 2 has a control unit 21, a water level calculation unit 22, and a flow rate calculation unit 23.

The control unit 21 stores, in advance, sections of a grid obtained by dividing a two-dimensional plane as a planar view of a region 101. The control unit 21 further receives an input of a water level $\eta_0$, a flow rate in x direction $M_0$, and a flow rate in y direction $N_0$, as initial values of a water level η, a flow rate in the x direction M, and a flow rate in the y direction N in each divided section of the grid, at x and y coordinates indicating a point of the region 101, from an user interface 1.

The control unit 21 outputs the water level $\eta_0$, the flow rate $M_0$, and the flow rate $N_0$ in each section of the grid, to the water level calculation unit 22 and the flow rate calculation unit 23. After that, the control unit 21 receives an input of the water level η in each section of the grid at step 1, from the water level calculation unit 22. The control unit 21 also receives an input of the flow rate M and the flow rate N in each section of the grid at step 1, from the flow rate calculation unit 23. In the following description, the initial state expressed by the water level $\eta_0$, the flow rate $M_0$, and the flow rate $N_0$ as initial values is set as step 0, and the subsequent steps are set as steps 1, 2, 3, . . . . In addition, all the steps are collectively expressed as step k (k=0, 1, 2, . . . ).

After that, the control unit 21 outputs the received data on the water level η, the flow rate M, and the flow rate N at step k (k denotes a natural number) to the water level calculation unit 22 and the flow rate calculation unit 23, and then repeats receiving the input of the water level η, the flow rate M, and the flow rate N at step k+1 from the water level calculation unit 22 and the flow rate calculation unit 23.

The control unit 21 also receives an input of a condition for the final state from the user interface 1. In the second embodiment, the control unit 21 receives the input of a condition for the final state, that is, a point of time when a tsunami has reached the deepest part of the land and started to ebb. Then, the control unit 21 receives calculation results up to step k, and uses the water level η, the flow rate M, and the flow rate N in each section of the grid from steps 1 to k to determine whether the condition for the final state is met. When the condition for the final state is met, the control unit 21 sets the current step k as a final step. In that case, the control unit 21 stops outputting the received data on the water level η, the flow rate M, and the flow rate N in each section of the grid at step k to the water level calculation unit 22 and the flow rate calculation unit 23.

After that, the control unit 21 outputs the water level η, the flow rate M, and the flow rate N in each section of the grid at each of steps 1 to k, to the three-dimensional SPH calculation processor 3. The control unit 21 also outputs information on a position of each section of the grid to the three-dimensional SPH calculation processor 3.

The water level calculation unit 22 stores a continuity equation expressed by Equation (1) as follows:

$$\frac{\partial \eta}{\partial t} + \frac{\partial M}{\partial x} + \frac{\partial N}{\partial y} = 0 \qquad (1)$$

At step k+1, the water level calculation unit 22 receives an input of the water level η, the flow rate M, and the flow rate N in each section of the grid at step k from the control unit 21. In this arrangement, the flow rate in the x direction M is expressed as $M = v_x \times D$ ($v_x$ denotes a speed in the x direction, D denotes an overall water depth which is equal to a sum of the water level η and a still water depth h). The flow rate in the y direction N is expressed as N=$v_y$×D ($v_y$ denotes a speed in the y direction M).

In the calculation at step k+1, the water level calculation unit 22 then substitutes the flow rate M and the flow rate N at step k into Equation (1) to determine ∂η/∂t as temporal differentiation of the water level at step k.

The water level calculation unit 22 further stores an equation of temporal integration expressed by Equation (2) as indicated below. In the equation, Δt denotes a time between the steps.

$$\eta_{k+1} = \eta_k + \left(\frac{\partial \eta_k}{\partial t}\right)\Delta t \quad (2)$$

In the calculation at step k+1, the water level calculation unit 22 substitutes ∂η/∂t as temporal differentiation of the water level at step k into Equation (2) to subject the water level η in each section of the grid at step k to temporal integration according to ∂η/∂t as temporal differentiation of the water level step k. Accordingly, the water level calculation unit 22 calculates the water level η at step k+1.

The water level calculation unit 22 then outputs the calculated water level r at step k+1 to the control unit 21.

The flow rate calculation unit 23 stores equations of motion expressed by Equations (3) and (4) as indicated below. In the equations, g denotes a gravity acceleration, D denotes an overall water depth (D=h+η, where h denotes the still water depth), and n denotes a roughness coefficient representing friction with the sea bottom.

$$\frac{\partial M}{\partial t} + \frac{\partial}{\partial x}\left(\frac{M^2}{D}\right) + \frac{\partial}{\partial y}\left(\frac{MN}{D}\right) + gD\frac{\partial \eta}{\partial x} + \frac{gn^2}{D^{7/3}}M\sqrt{M^2+N^2} = 0 \quad (3)$$

$$\frac{\partial N}{\partial t} + \frac{\partial}{\partial x}\left(\frac{MN}{D}\right) + \frac{\partial}{\partial y}\left(\frac{N^2}{D}\right) + gD\frac{\partial \eta}{\partial y} + \frac{gn^2}{D^{7/3}}N\sqrt{M^2+N^2} = 0 \quad (4)$$

At step k+1, the flow rate calculation unit 23 receives an input of the water level η, the flow rate M, and the flow rate N in each section of the grid at step k, from the control unit 21.

In the calculation at step k+1, the flow rate calculation unit 23 substitutes the water level η, the flow rate M, and the flow rate N at step k into Equation (3) to determine ∂M/∂t as temporal differentiation of a flow rate in the x direction at step k.

In the calculation at step k+1, the flow rate calculation unit 23 also substitutes the water level η, the flow rate M, and the flow rate N at step k into Equation (4) to determine ∂N/∂t as temporal differentiation of a flow rate in the y direction at step k.

The water level calculation unit 22 further stores equations for temporal integration expressed by Equations (5) and (6) as indicated below. In the equations, Δt denotes a time between the steps.

$$M_{k+1} = M_k + \left(\frac{\partial M_k}{\partial t}\right)\Delta t \quad (5)$$

$$N_{k+1} = N_k + \left(\frac{\partial N_k}{\partial t}\right)\Delta t \quad (6)$$

In the calculation at step k+1, the flow rate calculation unit 23 substitutes am/at as temporal differentiation of the flow rate in the x direction at step k into Equation (5) to subject the flow rate M in each section of the grid at step k to temporal integration according to ∂M/∂t as temporal differentiation of the flow rate in the x direction at step k. Accordingly, the flow rate calculation unit 23 calculates the flow rate M at step k+1.

In the calculation at step k+1, the flow rate calculation unit 23 also substitutes ∂N/∂t as temporal differentiation of the flow rate in the y direction at step k into Equation (6) to subject the flow rate N in each section of the grid at step k to temporal integration according to ∂N/∂t as temporal differentiation of the flow rate in the y direction at step k. Accordingly, the flow rate calculation unit 23 calculates the flow rate N at step k+1.

Then, the flow rate calculation unit 23 outputs the calculated flow rate M and the calculated flow rate N at step k+1 to the control unit 21.

Figure 5:
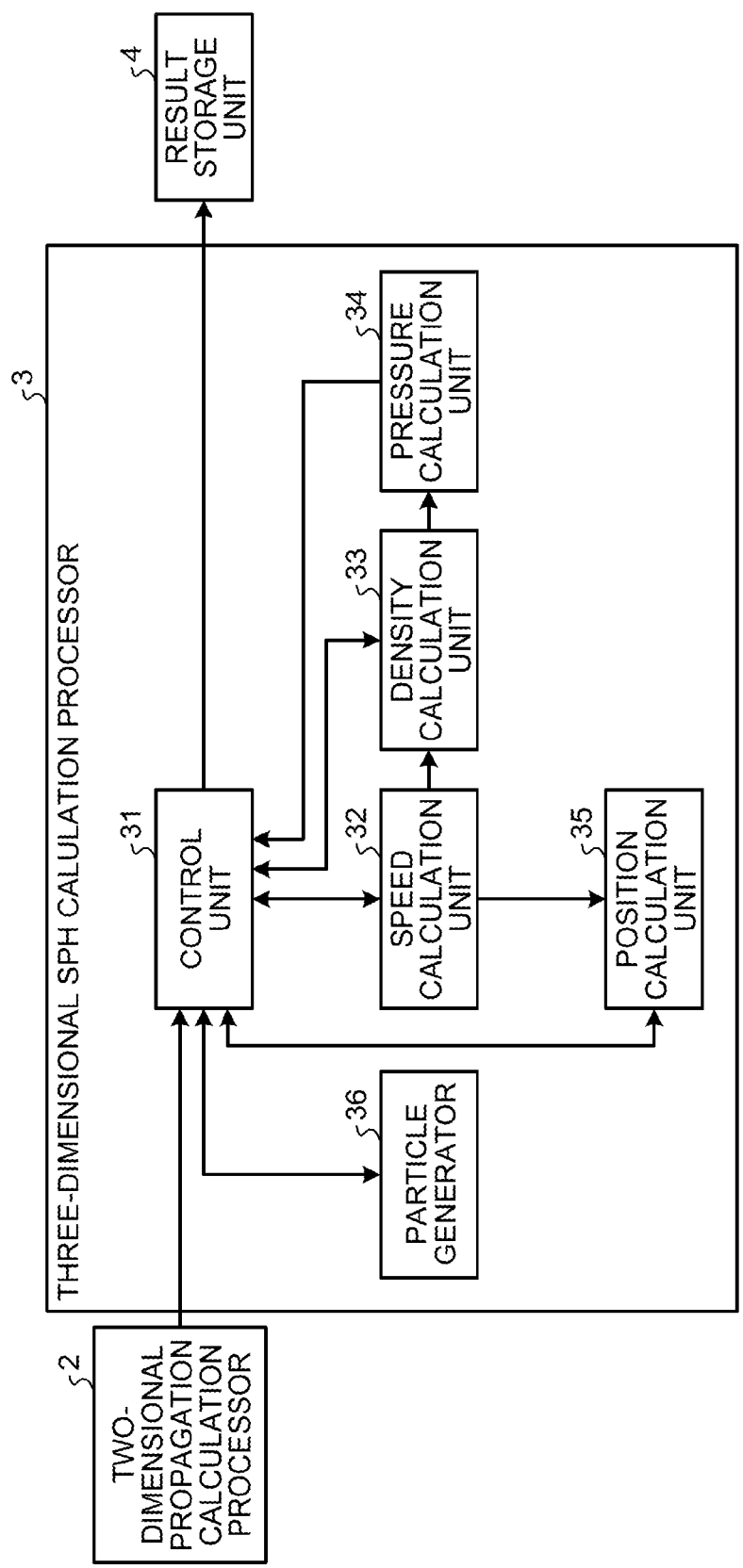
FIG. 5 is a block diagram of a three-dimensional SPH calculation processor according to the second embodiment.

Next, the three-dimensional SPH calculation processor according to the second embodiment will be described with reference to FIG. 5. FIG. 5 is a block diagram of the three-dimensional SPH calculation processor according to the second embodiment. As illustrated in FIG. 5, the three-dimensional SPH calculation processor 3 has a control unit 31, a speed calculation unit 32, a density calculation unit 33, a pressure calculation unit 34, a position calculation unit 35, and a particle generation unit 36. In this arrangement, the steps of the three-dimensional particle calculation are finer than the steps of the two-dimensional propagation calculation. Accordingly, in the following description, the steps of the three-dimensional particle calculation are referred to as steps #n for differentiation from the steps of the two-dimensional propagation calculation.

The control unit 31 stores, as a condition for starting the three-dimensional particle method calculation, a point of time when the water level r at the boundary in the region 100 illustrated in FIG. 2 exceeds 50 cm, for example. The control unit 31 also stores, in advance, particles and fixed boundary elements for setting boundary conditions for a movement of particles. The fixed boundary elements are obtained by modeling surface elements formed by dividing a sea bottom surface, a ground surface, a structure surface, and the like, into minute portions. For example, the fixed boundary elements may be obtained by modeling the entire boundary as an assembly of minute discs, and each of the boundary elements may include a central coordinate, normal vectors of surface elements, areas of surface elements, and the like. In addition, the fixed boundary elements may be obtained by expressing the entire boundary as an assembly of polygons, and each of the boundary elements may include position coordinates of a plurality of vertexes.

The control unit 31 receives an input of the water level η, the flow rate M, and the flow rate N in each section of the grid at each step, as results of the two-dimensional propagation calculation, from the two-dimensional propagation calculation processor 2. The control unit 31 also receives an input of information on a position of each section of the grid from the two-dimensional propagation calculation processor 2.

Then, of the information on the position of each section of the grid and the water level η in each section of the grid at each step, the control unit 31 identifies a step at a point of time when the water level η at the boundary has exceeded 50 cm, as step #0.

The control unit 31 then extracts the water level η, the flow rate M, and the flow rate N in each section of the grid at step #0.

In the three-dimensional particle method calculation, a calculation is performed with higher accuracy to analyze a motion of a continuum in more detail as compared to the grid used in the two-dimensional propagation calculation. Accordingly, the control unit 31 stores, in advance, the number of sections of a grid to be divided more finely for determining points to be used in the three-dimensional particle method calculation. The control unit 31 conducts interpolation of the water level η in each section of the grid at step #0 to determine the water level η at position coordinates to be used in the three-dimensional particle method calculation. Next, the control unit 31 adds the still water depth h to the water level η at each position coordinate to be used in the three-dimensional particle method calculation to determine the overall water depth D at each position coordinate. In addition, the control unit 31 determines by interpolation the flow rate M and the flow rate N at step #0 at the position coordinates to be used in the three-dimensional particle method calculation. Then, the control unit 31 divides the flow rate M and the flow rate N at step #0 at each position coordinate by the overall water depth to determine the initial value $v_0$ of the speed at each position coordinate.

The control unit 31 then places particles of a predetermined size at each position coordinate using the overall water depth D at each position coordinate. For example, when the diameter of particles is set at 1 m and the overall water depth at one position coordinate is 50 m, the control unit 31 places a stack of 50 particles at the position coordinate. Accordingly, the initial value of the position of particles at each position coordinate is decided.

Figure 6:
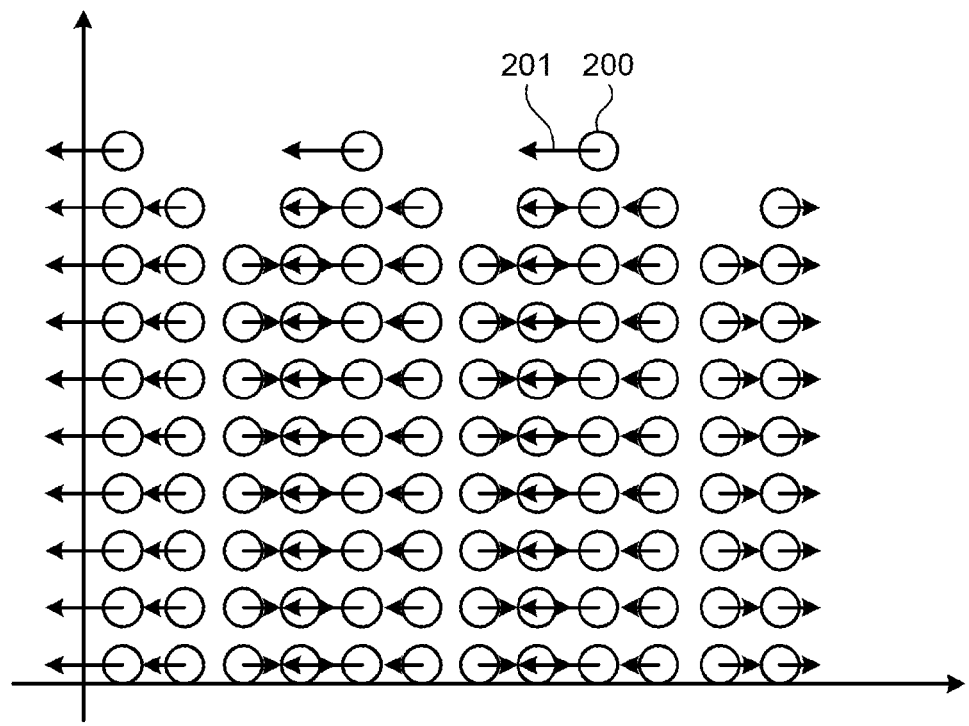
FIG. 6 is a schematic diagram illustrating settings of initial values.

The control unit 31 further assigns the calculated speed $v_0$ at each position coordinate as an initial value of the speed of each particle placed at each position coordinate. FIG. 6 is a schematic diagram illustrating settings of the initial values. FIG. 6 illustrates schematically a portion of a cross section of the region 100 illustrated in FIG. 2. In FIG. 6, the vertical axis represents a water depth, and the lateral axis represents a specific direction parallel to the still water surface. As illustrated in FIG. 6, the control unit 31 places particles 200 stacked in a direction of a water depth at each position coordinate. As illustrated by arrows 201 in FIG. 6, the control unit 31 assigns a speed to each particle according to the sizes of the arrows 201. In FIG. 6, for example, when a direction in which the lateral axis extends corresponds to a direction toward the sea, the arrows 201 oriented in a direction in which the lateral axis decrease indicates that the particles moves toward the land. In addition, the longer the arrows 201 are, the higher the speed of the particles becomes.

After setting of the initial values of position and speed of each particle is finished, the control unit 31 creates a list of other particles within the impact extent of each particle. In the following description, other particles within the impact extent of each particle are referred to as "neighboring particles," and the list of neighboring particles is referred to as a "neighboring particle list."

Figure 7:
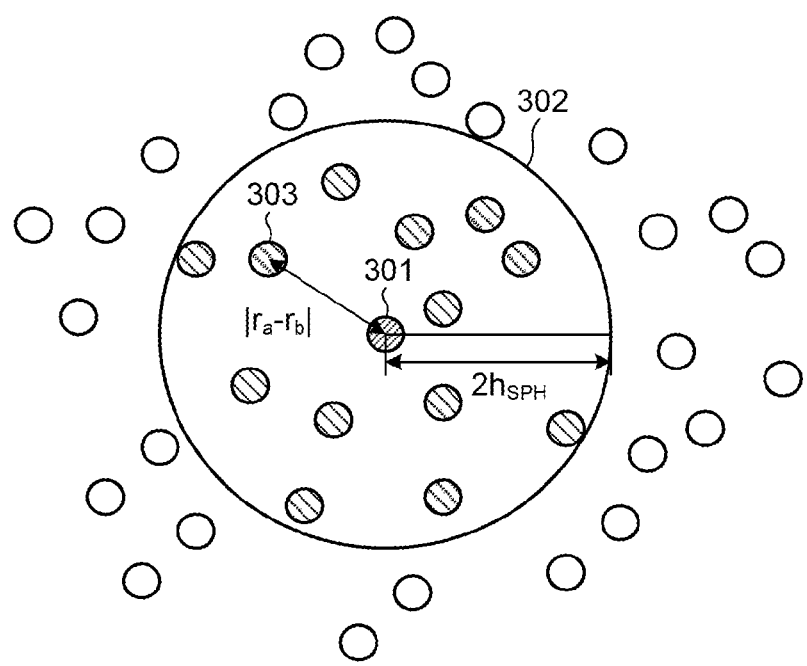
FIG. 7 is a diagram illustrating an influence domain and neighboring particles.

FIG. 7 is a diagram illustrating the influence domain and the neighboring particles. Here, the influence domain and the neighboring particles of each particle will be described with reference to FIG. 7. In the following description, it is assumed that a subject particle and another particle have an interaction on each other with a distance between the two of 2 $h_{SPH}$ or less. The interaction here refers to application of force by one particle to another during a movement of the one particle, for example.

In the following description, a particle 301 illustrated in FIG. 7 is taken as an example. An influence domain 302 of the particle 301 is contained in a circle with a radius of 2 $h_{SPH}$ centered on the particle 301. The radius of 2 $h_{SPH}$ is an influence radius of the particle 301. Other particles included in the influence domain 302 are neighboring particles of the particle 301. In FIG. 7, shaded particles such as a particle 303 are neighboring particles, for example. That is, the other particles interacted by the particle 301 are shaded neighboring particles. In reverse, the particle 301 is interacted only by the shaded neighboring particles. It is empirically known that interaction between a subject particle and other particles can be sufficiently analyzed by setting a radius of 2 $h_{SPH}$ so as to include several tens of neighboring particles.

When it is assumed that the position vector indicating the position of the particle 301 is designated as $r_a$ and the position vector indicating the position of the particle 303 is designated as $r_b$, the distance between the particle 301 and the particle 303 is expressed by $|r_a-r_b|$. That is, when $|r_a-r_b| \leq 2$ h is met, the particle 303 is regarded as a neighboring particle of the particle 301.

When creating a neighboring list of the particle 301 illustrated in FIG. 7, for example, the control unit 31 extracts shaded particles such as the particle 303 included in the influence domain 302, as neighboring particles of the particle 301. For example, the control unit 31 determines the distance between the particle 301 as a subject particle and each of other particles based on the position of the particle 301 and the position of each of the other particles, and extracts particles with a distance of 2 $h_{SPH}$ or less as neighboring particles.

Returning to FIG. 5, the control unit 31 performs extraction of neighboring particles for all of the particles. Then, the control unit 31 creates a neighboring particle list in which each of the subject particles and extracted neighboring particles of the subject particle are associated with each other. The control unit 31 then outputs the created neighboring particle list to the speed calculation unit 32, the density calculation unit 33, the pressure calculation unit 34, the position calculation unit 35, and the particle generation unit 36.

After that, the control unit 31 receives an input of the speed v of each subject particle at step #n from the speed calculation unit 32. The control unit 31 also receives an input of the density ρ of each subject particle at step #n from the density calculation unit 33. In addition, the control unit 31 receives an input of the pressure P of each subject particle at step #n from the pressure calculation unit 34. Further, the control unit 31 receives an input of the position r of each subject particle at step #n from the position calculation unit 35. In this arrangement, one step refers to a state after a lapse of a time of $\Delta t_{SPH}$. For example, the speed at step #n+1 refers to a speed after a lapse of a time of $\Delta t_{SPH}$ from the step #n.

Figure 8:
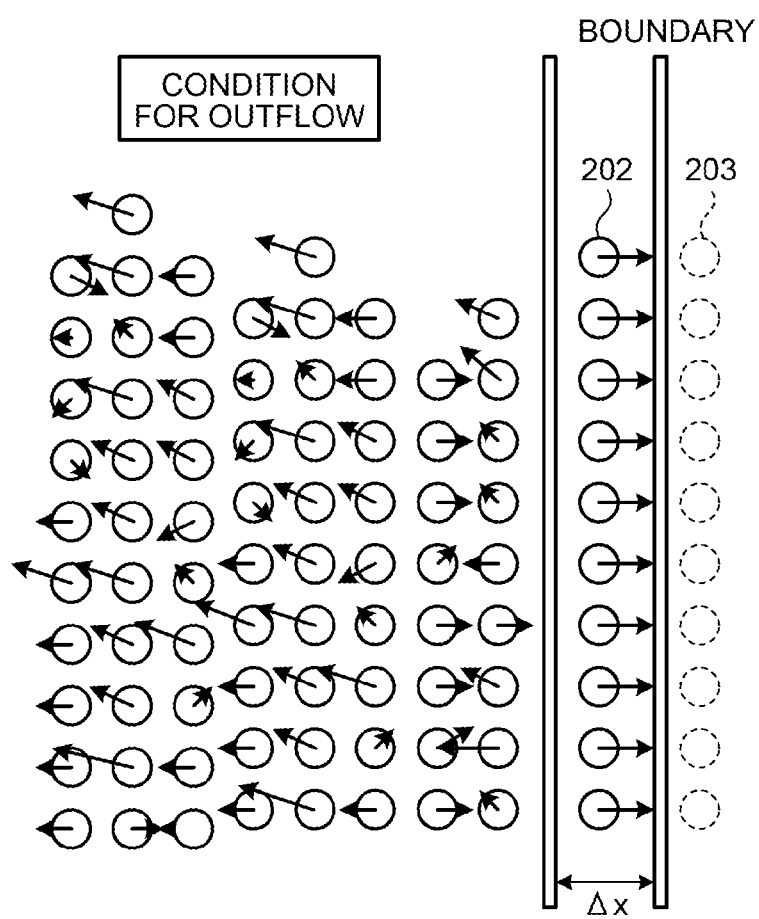
FIG. 8 is a schematic diagram of an outflow of particles.

The control unit 31 also stores an extent of a specific distance Δx from the boundary in the region 100 illustrated in FIG. 2, as a boundary region. In this arrangement, Δx is preferably set based on the size of particles. Specifically, Δx preferably has a width almost equivalent to the size of particles. For example, when the diameter of particles is 1 m, Δx is preferably set with a width slightly larger than 1 m. Then, the control unit 31 determines whether the subject particle is out of the boundary in the region 100 illustrated in FIG. 2, based on the received data on the position r of the subject particle at step #n. When it has been determined that the subject particle is out of the boundary, the control unit 31 excludes the subject particle from the calculations at step #n+1 and subsequent steps. FIG. 8 is a schematic diagram of an outflow of particles. As illustrated in FIG. 8, when a particle 202 is out of the boundary and becomes a particle 203, the control unit 31 excludes the particle 203 from calculations.

The control unit 31 further receives an input of the position r of particles generated at step #n from the particle generation unit 36. Then, the control unit 31 incorporates the newly generated and received particles into the calculations at step #n+1 and subsequent steps.

The control unit 31 also determines the speed v of particles existing in the boundary region at step #n, from the data on the flow rate M and the flow rate N received from the two-dimensional propagation calculation processor 2. Subsequently, the control unit 31 replaces the determined speed v with the speed v at step #n received from the speed calculation unit 32 and the position calculation unit 35. In addition, the control unit 31 also replaces the density ρ and the pressure P of the particles existing in the boundary region at step #n with general density and pressure of sea water. As in the foregoing, the control unit 31 determines boundary conditions at step #n and assigns the boundary conditions to the particles existing in the boundary region. In the three-dimensional particle method calculation in the second embodiment, there exists no particles out of the boundary and thus it is not possible to determine correctly a motion of the particles existing in the boundary region. Accordingly, the motion of the particles existing in the boundary region is estimated based on high-accuracy information determined by the two-dimensional propagation calculation to improve the correctness of the calculation.

Figure 9:
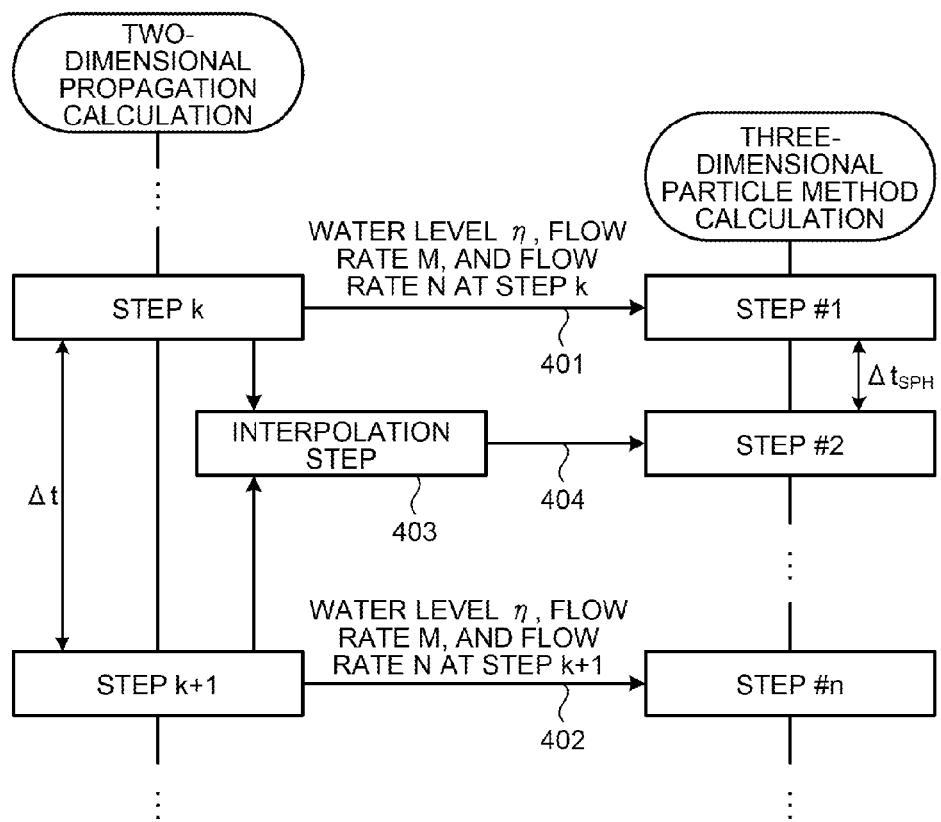
FIG. 9 is a diagram for describing interpolation in determination of boundary conditions.

However, as described above, the two-dimensional propagation calculation and the three-dimensional particle method calculation are different in accuracy of steps. That is, there is a case that the step k in the two-dimensional propagation calculation does not exist in correspondence with the step #n in the three-dimensional particle method calculation. Thus, the control unit 31 calculates the water level η, the flow rate M, and the flow rate N at the timing that coincides with each step #n in the three-dimensional particle method calculation. FIG. 9 is a diagram for describing interpolation in the determination of boundary conditions. In FIG. 9, for example, the three-dimensional particle method calculation is started at step k of the two-dimensional propagation calculation, and the step k+1 as the next step of the two-dimensional propagation calculation and the timing of the step #n of the three-dimensional particle method calculation coincide with each other. In this case, Δt represents the time between the steps of the two-dimensional propagation calculation, and $\Delta t_{SPH}$ represents the time between the steps of the three-dimensional particle method calculation. In this case, at step #1, the control unit 31 can use the water level η, the flow rate M, and the flow rate N at step k to calculate the boundary conditions as in correspondence 402. In addition, at step #n, the control unit 31 can use the water level η, the flow rate M, and the flow rate N at step k+1 to calculate the boundary conditions as in the correspondence 402. However, there no exist steps in the two-dimensional propagation calculation corresponding to the steps #2 to #n−1. Accordingly, at step #2, for example, the control unit 31 uses the water level η, the flow rate M, and the flow rate N at steps k and k+1 to perform interpolation to determine the water level η, the flow rate M, and the flow rate N at interpolated step 403 corresponding to the step #2. Then, the control unit 31 uses the determined water level η, flow rate M, and flow rate N at the interpolated step 403 to calculate the boundary conditions at step #2, as in correspondence 404.

For example, the water level at the interpolated step can be determined as in Equation (7) indicated below. In the equation, the time of the step at which the boundary conditions are to be obtained in the particle method calculation is set as $t_{SPH}$. In addition, the times of the steps n and n+1 in the two-dimensional propagation calculation closest to $t_{SPH}$ are set as nΔt and (n+1) Δt, respectively.

$$\eta(t_{SPH}) = \frac{(t_{SPH} - n\Delta t)\eta((n+1)\Delta t) - (t_{SPH} - (n+1)\Delta t)\eta(n\Delta t)}{\Delta t} \quad (7)$$

The control unit 31 then outputs the density ρ, the pressure P, and the position r of each subject particle at step #n, as the density, the pressure, and the position of each subject particle at the current step to be used in the calculation at step #n+1, to the speed calculation unit 32.

The control unit 31 also outputs the density ρ of each subject particle at step #n as the density at the current step to be used in the calculation at step #n+1, to the density calculation unit 33.

The control unit 31 also outputs the density ρ of each subject particle at step #n+1 to be used in the calculation of pressure at step #n+1, to the pressure calculation unit 34.

The control unit 31 also outputs the speed v of each subject particle at step #n as the speed at the current step to be used in the calculation at step #n+1, to the position calculation unit 35.

Comprehensively describing the foregoing operations, the control unit 31 receives an input of the speed v, the density ρ, the pressure P, and the position r of each subject particle at step #n+1 after a lapse of a time of $\Delta t_{SPH}$ from the step #n. Next, the control unit 31 decides particles to be eliminated based on the positions of the particles, and uses information from the particle generation unit 36 to generate particles. After the elimination and generation of the particles, the control unit 31 determines the speed v, the density ρ, the pressure P, and the position r of the particle in the boundary region, based on the water level η, the flow rate M, and the flow rate N calculated by the two-dimensional propagation calculation, thereby setting the boundary conditions. After that, the control unit 31 outputs the foregoing information to each of the components, and then receives an input of the speed v, the density ρ, the pressure P, and the position r of each subject particle at step #n+1 after a lapse of a time of $\Delta t_{SPH}$ from the step #n. As in the foregoing, when having already received data on the speed v, the density ρ, the pressure P, and the position r at step #n, the control unit 31 then receives the speed v, the density ρ, the pressure P, and the position r of each subject particle at step #n+1. Then, the control unit 31 receives sequentially the speed v, the density ρ, the pressure P, and the position r of each subject particle at each step until the specified timing for termination of the simulation is reached.

The control unit 31 further receives an each input of information, speed v, density ρ, pressure P, and position r of each subject particle at step #n, and stores the received information at step #n in the result storage unit 4.

The control unit 31 then uses the received data on a position of each subject particle at step #n to determine neighboring particles of each subject particle at step #n, and creates a neighboring particle list. Then, the control unit 31 outputs the created neighboring particle list to the speed calculation unit 32, the density calculation unit 33, the pressure calculation unit 34, the position calculation unit 35, and the particle generation unit 36. As in the foregoing, the control unit 31 outputs the speed v, the density ρ, the pressure P, the position r, and the neighboring particle list at each step to each of the components. Then, the control unit 31 instructs the speed calculation unit 32, the density calculation unit 33, the pressure calculation unit 34, the position calculation unit 35, and the particle generation unit 36 to use the current data to calculate data by one step later, and repeat the instruction until the final step is reached.

The speed calculation unit 32 receives an input of the density ρ, the pressure P, and the position r of each subject particle at step #n as the density, the pressure, and the position of each subject particle at the current step to be used in calculation at step #n+1, from the control unit 31.

The speed calculation unit 32 stores an equation of motion expressed by Equation (8) indicated below.

$$\frac{dv_a}{dt} = -\sum_b m_b \left[ \left( \frac{P_b + P_a}{\rho_b \rho_a} \right) + \Pi_{ab} \right] \frac{\partial W(|r_a - r_b|, h_{SPH})}{\partial r_a} \quad (8)$$

In Equation (8), the indexes of variables and coefficients denote particles. For example, $r_a$, $v_a$, $\rho_a$, $P_a$, and $m_a$ refer to the position vector, the speed vector, the density, the pressure, and the mass of a particle a. In Equation (8), W denotes a kernel function used for configuring a continuous field from distribution of particles. The kernel function is, for example, a quintic spline function as indicated in Equation (9). In Equation (9), $q = r/h_{SPH}$.

$$W(r, h_{SPH}) = \begin{cases} \alpha_d \left(1 - \frac{q}{2}\right)^4 (2q+1) & (0 \le q \le 2) \\ 0 & (2 < q) \end{cases} \quad (9)$$

In Equation (8), $\Pi_{ab}$ is an artificial viscosity term functioning between particles a and b. For example, such a formula as given by Equation (10) is employed as follows:

$$\Pi_{ab} = \begin{cases} \frac{-\alpha c \mu_{ab} + \beta \mu_{ab}^2}{\rho_{ab}} & (v_a - v_b) \cdot (r_a - r_b) < 0 \\ 0 & (v_a - v_b) \cdot (r_a - r_b) \ge 0 \end{cases} \quad (10)$$

In Equation (10), μ denotes a viscosity coefficient, which is expressed by Equation (11) indicated below. In Equation (11), $\eta_{SPH}$ is a parameter to prevent the denominator from becoming zero, and takes a value sufficiently small with respect to a conceived spatial scale. For example, $\eta_{SPH} = 0.01 h_{SPH}$ or the like.

$$\mu_{ab} = \frac{h_{SPH}(r_a - r_b) \cdot (v_a - v_b)}{|r_a - r_b|^2 + \eta_{SPH}^2} \quad (11)$$

The speed calculation unit 32 then substitutes the received data on the density ρ, the pressure P, and the position r of the subject particle a and a neighboring particle b at step #n into Equation (8) to determine an acceleration dv/dt at step #n.

The speed calculation unit 32 further determines a repulsive force from the boundary using Equation (12) indicated below.

$$\frac{dv_a}{dt} = -\frac{(\beta c_s)^2}{d^2} s \quad (12)$$

Figure 10:
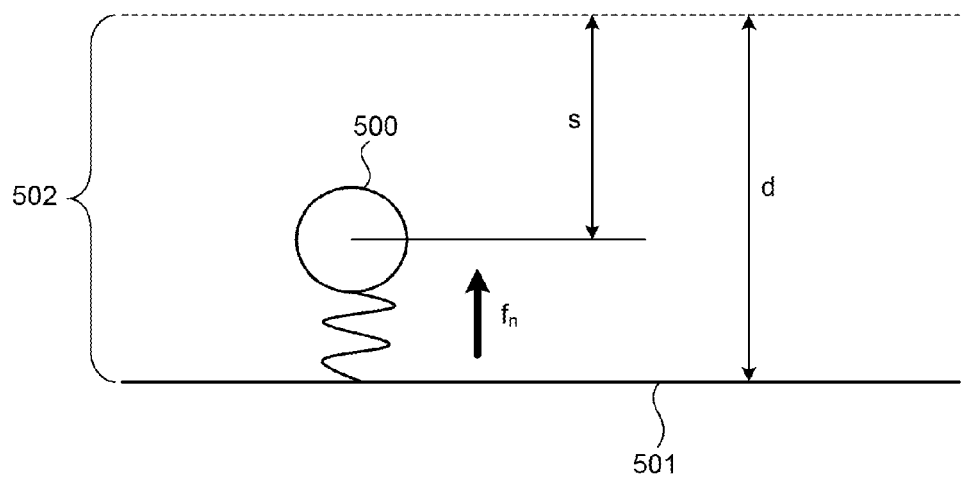
FIG. 10 is a diagram for describing a repulsion force from the boundary.

Equation (12) will now be described with reference to FIG. 10. FIG. 10 is a diagram for describing the repulsive force from the boundary. Here, a repulsive force from the boundary applied to a particle 500 illustrated in FIG. 10 will be described.

As illustrated in FIG. 10, d denotes a predetermined distance from a boundary surface 501, and represents a boundary layer 502, that is, a layer with a width of d from the boundary surface. In FIG. 10, s denotes an intrusion distance of the particle 500 into the boundary layer 502.

In the second embodiment, taking into account the boundary layer 502 with a width of d from the boundary surface 501, it is assumed that, when the particle 500 enters into the boundary layer 502, a repulsive acceleration is applied to the particle 500 in a direction from the boundary surface 501 to the particle 500. A repulsive force $f_n$ is applied as $f_n = ks$ in the same form as that of a repulsive force generated from an elastic spring. A spring stiffness coefficient k is determined such that kinetic energy $mc_0^2/2$ possessed by a particle with a sound speed $c_0$ and elastic strain energy $kd^2/2$ with entry of the particle into the boundary layer 502 by a length of d, are at the same level. That is, it is not considered that, in simulation analyzing a motion of a continuum, the particle 500 exceeds a sound speed, and thus it is possible to avoid the particle 500 from passing through the boundary surface 501 by setting the spring stiffness coefficient k such that the energies disappear on the boundary surface 501 if the particle 500 enters into the boundary surface 501 at a sound speed. Accordingly, β is set as a parameter of about 1. Setting β in this manner leads to Equation (12).

Using the repulsive force expressed by Equation (12) makes it possible to prevent particles from slipping out from the boundary wall, improve the correctness of friction and free slip conditions to be introduced, and suppress physically meaningless energy consumption at the boundary. In addition, since Equation (12) is expressed in a simplified manner, using the repulsive force expressed by Equation (12) can suppress calculation load.

Although Equation (12) is used in the second embodiment, the repulsive force may be expressed by another equation. For example, taking into account the possibility that the repulsive force becomes too large, the repulsive force may be set such that an elastic spring is considered when particles come closer to the boundary surface, and in reverse, no elastic spring is considered when particles draw apart from the boundary surface. This repulsive force may be called one-direction elastic spring method. Although, from the viewpoint of energy saving, it is preferred to use the repulsive force as expressed in Equation (12) considering an elastic spring regardless of a relative speed of the particles and the boundary surface, the one-direction elastic spring method may be used to avoid unnatural repulsion at the boundary.

The speed calculation unit 32 then adds up the acceleration dv/dt, which has been calculated using Equation (8) as the equation of motion, and the repulsive force which has been determined using Equation (12) to calculate an acceleration v' at step #n. The acceleration v' refers to an acceleration vector.

Further, the speed calculation unit 32 stores Equation (13) for temporal integration as indicated below. In the equation, $v_n$ denotes a speed at step #n, and $v_n'$ denotes an acceleration at step #n.

$$v_{n+1} = v_n + v_n' \times \Delta t_{SPH} \quad (13)$$

The speed calculation unit 32 then substitutes the determined speed v and the acceleration v' at step #n into Equation (13) to subject the speed v at step #n to temporal integration with the acceleration v' at step #n. Accordingly, the speed calculation unit 32 determines the speed v at step #n+1.

The speed calculation unit 32 outputs the calculated speed v of each particle at step #n+1 to the control unit 31. The speed calculation unit 32 also outputs the calculated speed v of each particle at step #n+1 to the density calculation unit 33. The speed calculation unit 32 further outputs the calculated speed v of each particle at step #n+1 to the position calculation unit 35.

The density calculation unit 33 receives an input of the density ρ of each subject particle at step #n as a density at the current step to be used in a calculation at step #n+1, from the control unit 31. The density calculation unit 33 further receives an input of the speed v of each particle at step #n+1, from the speed calculation unit 32.

The density calculation unit 33 stores a continuity equation expressed by Equation (14) as follows:

$$\frac{d\rho_a}{dt} = \sum_b m_b (v_a - v_b) \cdot \frac{\partial W(|r_a - r_b|, h_{SPH})}{\partial r_a} \quad (14)$$

The density calculation unit 33 substitutes the speed v of each particle at step #n+1 input from the speed calculation unit 32 into Equation (14) to calculate density temporal differentiation dρ/dt of each particle at step #n+1.

The density calculation unit 33 further stores an equation of temporal integration expressed by Equation (15) as follows:

$$\rho_{n+1} = \rho_n + \frac{\partial \rho}{\partial t} \Delta t_{SPH} \quad (15)$$

The density calculation unit 33 substitutes the calculated values of density of each particle and density temporal differentiation $d\rho_a/dt$ of each particle at step #n into Equation (15) to subject the density ρ at step #n to temporal integration with the density temporal differentiation dρ/dt. Accordingly, the density calculation unit 33 determines the density ρ at step #n+1.

The density calculation unit 33 outputs the calculated density ρ at step #n+1 to the control unit 31 and the pressure calculation unit 34.

The pressure calculation unit 34 receives an input of the density ρ at step #n+1 from the density calculation unit 33.

The pressure calculation unit 34 stores an equation of state expressed by Equation (16) indicated below. In the equation, $c_s$ and $\rho_0$ denote the sound speed and reference density of a fluid, respectively.

$$P_a = c_s^2 (\rho_a - \rho_0), \quad (16)$$

The pressure calculation unit 34 substitutes the density ρ at step #n+1 input from the density calculation unit 33 into Equation (16) to calculate the pressure ρ at step #n+1.

The pressure calculation unit 34 outputs the calculated pressure P at step #n+1 to the control unit 31.

The position calculation unit 35 receives an input of the speed v at step #n+1 from the speed calculation unit 32.

The position calculation unit 35 stores an equation of temporal integration expressed by Equation (17) as follows:

$$r_{n+1} = r_n + v_{n+1} \Delta t_{SPH} \quad (17)$$

The position calculation unit 35 substitutes the speed v at step #n+1 input from the speed calculation unit 32 into Equation (17) to subject the position r at step #n to temporal integration with the speed v at step #n+1. Accordingly, the position calculation unit 35 determines the position r at step #n+1.

The particle generation unit 36 stores divided regions formed by dividing the boundary surface into predetermined regions each of which corresponds to a particle. In this arrangement, the predetermined regions may have any shape, for example, a rectangle or a circle, as far as the regions are densely arranged. In the following description, the predetermined regions will be referred to as "particle generators." The particle generators are set to allow a particle method calculation to be performed without a failure by generating particles with an inflow of particles into the boundary. As surface elements formed by dividing the boundary surface in the region 100 into minute portions, the particle generators have central coordinates, a normal vector of a surface element, an area of a surface element, an inflow or outflow volume, and a reference volume. The reference volume here refers to a volume corresponding to one particle. The outflow or inflow volume in the particle generator described later is set to 0 at starting of calculation, and increases with an inflow and decreases with an outflow. The outflow or inflow volume takes a negative value when sea water flows out through the particle generators.

The particle generation unit 36 receives an input of the speed determined by the two-dimensional propagation calculation at the position of each particle generator at step #n, from the control unit 31.

The particle generation unit 36 then determines a flow rate vector indicating a flow rate of sea water at the position of each particle generator based on the received data on speed. The particle generation unit 36 further generates an area vector, to which the size of the vector is proportional to an area of the particle generator and the direction is normal to an area of the particle generator. If it is assumed that the area of the particle generator is designated as S and the normal vector as u, the area vector can be expressed as uS, for example.

The particle generation unit 36 then determines an inner product of the flow rate vector and the area vector in each particle generator, and calculates an increase or decrease in the outflow or inflow volume of sea water in each particle generator at step #n.

The particle generation unit 36 then adds the increase or decrease in the outflow or inflow volume to the outflow or inflow volume of sea water at step #n in each particle generator to determine the outflow or inflow volume of sea water at the new step #n in each particle generator. For example, it is assumed that the old outflow or inflow volume is designated as $V^{old}$ and the new outflow or inflow volume as $V^{new}$, the particle generation unit 36 can calculate the new outflow or inflow volume by Equation (18) as follows:

$$V^{new} = V^{old} + v \cdot uS \quad (18)$$

Next, the particle generation unit 36 determines whether the outflow or inflow volume of sea water at step #n+1 in each particle generator is equal to or more than the reference volume that is equal to the volume of a particle. When there is any particle generator in which the outflow or inflow volume of sea water is equal to or more than the reference volume, the particle generation unit 36 decides to generate a particle at a decided position corresponding to the particle generator. The decided position corresponding to the particle generator here may be a position at which a particle is placed so as to contact the particle generator, or may be a position at which a particle is placed at a predetermined distance from the particle generator in the normal direction. Then, the particle generation unit 36 subtracts the reference volume from the outflow or inflow volume of sea water at step #n+1 in the particle generator by which the generation of a particle has been decided, and sets the result of the subtraction as outflow or inflow volume of sea water at step #n+1.

Figure 11:
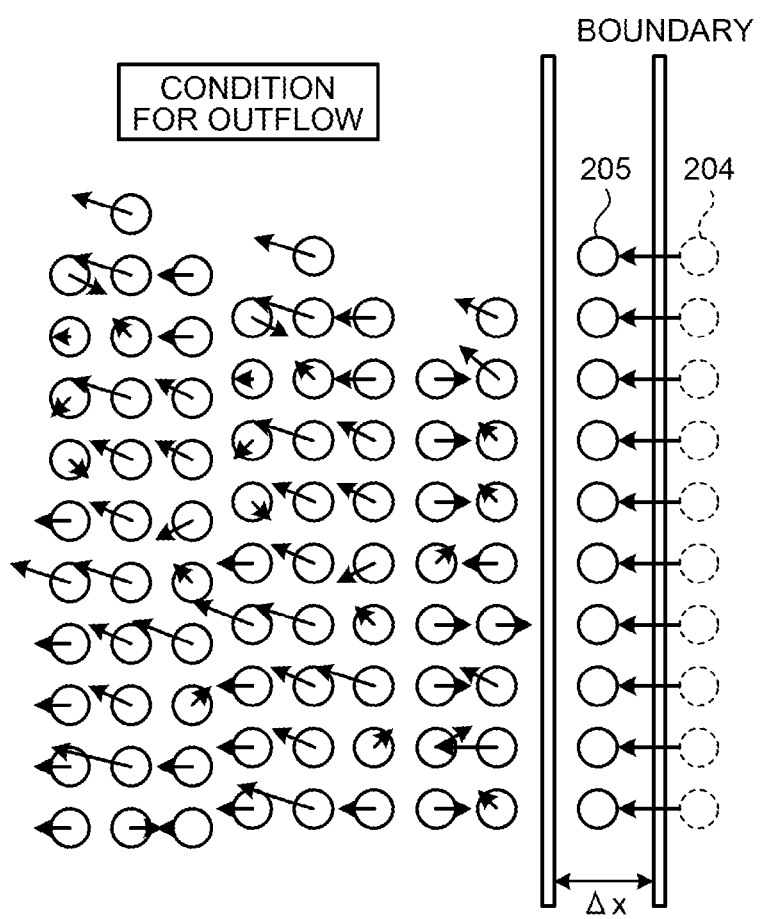
FIG. 11 is a schematic diagram of an inflow of particles.

FIG. 11 is a schematic diagram of the inflow of particles. When sea water having the volume of a particle 204 outside of the boundary flows into the inside across the boundary, the particle generation unit 36 decides to generate a new particle 205 at a position inside the boundary corresponding to the inflowing particle 204.

When there is any particle generator with which the outflow or inflow volume of sea water at step #n+1 is under the reference volume in a negative direction, the particle generation unit 36 adds the reference volume to the outflow or inflow volume of sea water at step #n+1 in the particle generator, and sets the result of the addition as an outflow or inflow volume of sea water at step #n+1.

The particle generation unit 36 then notifies the position of the particle the generation of which is decided, to the control unit 31. The position of the particle the generation of which is decided, may be the position of a center of the generated particle, for example.

The particle generation unit 36 repeats the foregoing process of particle generation until the step is terminated.

Figure 12:
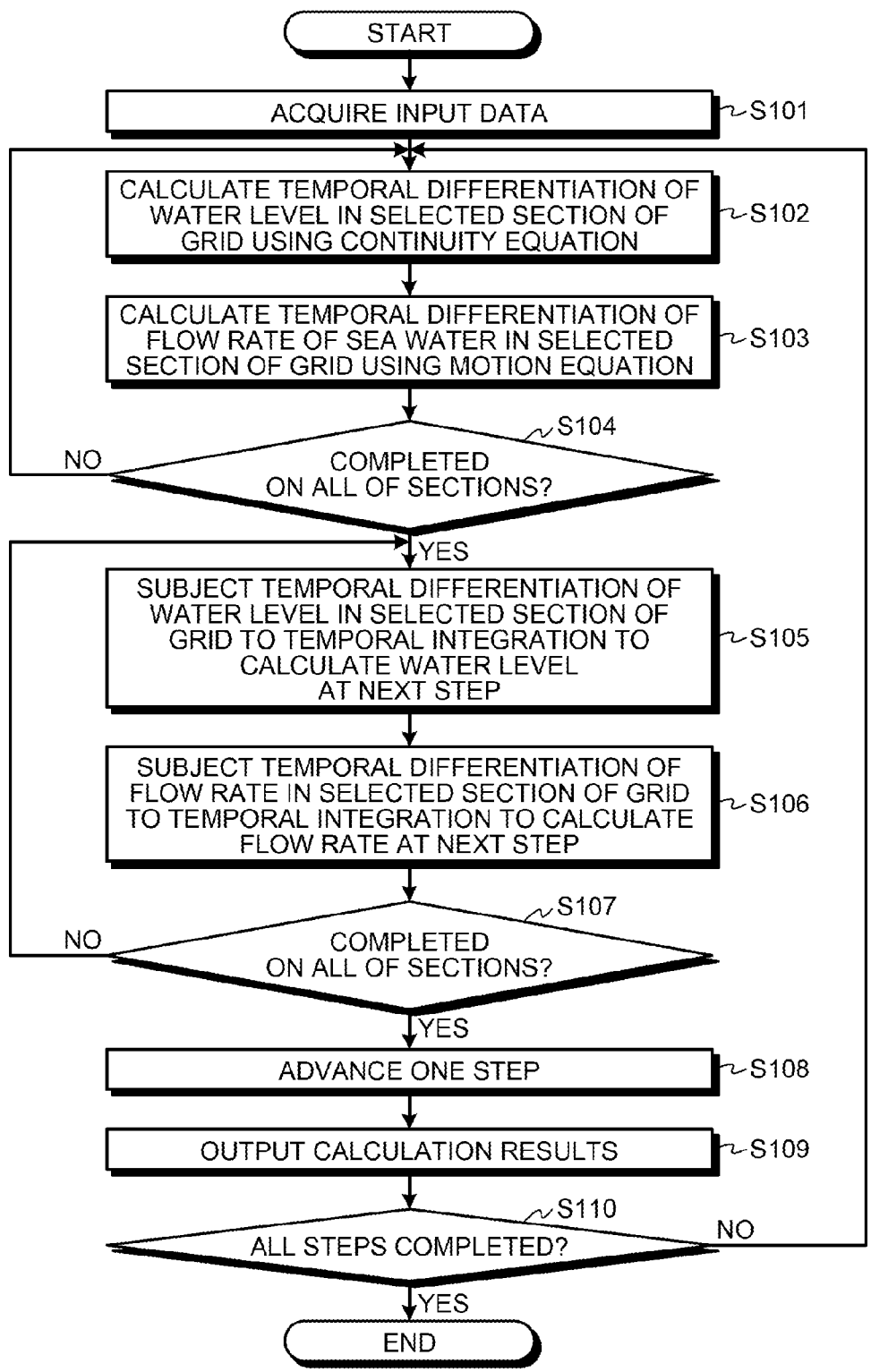
FIG. 12 is a flowchart of a process of a two-dimensional propagation calculation according to the second embodiment.

Next, a process of two-dimensional propagation calculation according to the second embodiment will be described with reference to FIG. 12. FIG. 12 is a flowchart of a process of the two-dimensional propagation calculation according to the second embodiment.

The control unit 21 acquires the water level $\eta_0$, the flow rate $M_0$, and the flow rate $N_0$ in each divided sections of the grid in the region 101, as the initial values of the water level, the flow rate in the x direction, and the flow rate in the y direction, from input from the user interface 1 (step S101). The control unit 21 also selects one of sections of the grids as a selected section to be analyzed. Then, the control unit 21 outputs the water level $\eta_0$, the flow rate $M_0$, and the flow rate $N_0$ in the selected section to the water level calculation unit 22 and the flow rate calculation unit 23.

The water level calculation unit 22 calculates temporal differentiation of the water level $\partial\eta/\partial t$ in the selected section of grid using the continuity equation in Equation (1) (step S102).

The flow rate calculation unit 23 also calculates temporal differentiations $\partial M/\partial t$ and $\partial N/\partial t$ of the flow rate M and the flow rate N of sea water in the selected section of grid using the equations of motion expressed by Equations (3) and (4) (step S103).

The control unit 21 also determines whether the calculation is completed on all of the sections (step S104). When the calculation is not completed on all of the sections (step S104: No), the control unit 21 selects a new selected section and returns to step S102.

In contrast, when the calculation is completed on all of the sections (step S104: Yes), the control unit 21 selects a selected section and instructs the water level calculation unit 22 and the flow rate calculation unit 23 to calculate the water level and the speed at the next step.

The water level calculation unit 22 subjects the water level $\eta$ in the selected section to temporal integration according to the temporal differentiation $\partial\eta/\partial t$ of the water level in the selected section (step S105) to determine the water level at the next step. Then, the water level calculation unit 22 outputs the calculated water level $\eta$ at the next step to the control unit 21.

The flow rate calculation unit 23 also subjects the flow rate M and the flow rate N in the selected section to temporal integration according to the temporal differentiations $\partial M/\partial t$ and $\partial N/\partial t$ of the flow rate in the selected section of grid (step S106) to determine the flow rate M and the flow rate N at the next step. Then, the flow rate calculation unit 23 outputs the calculated flow rate M and flow rate N at the next step to the control unit 21.

The control unit 21 determines whether the calculation is completed on all of the sections (step S107). When the calculation is not completed on all of the sections (step S107: No), the control unit 21 selects a new selected section and returns to step S105.

In contrast, when the calculation is completed on all of the sections (step S107: Yes), the control unit 21 advances one analysis step (step S108).

The control unit 21 then outputs results of the calculation at the current analysis step to the three-dimensional SPH calculation processor 3 (step S109). In this flow, the control unit 21 outputs the calculation results upon completion of the calculation at each step, but the present invention is not limited to this, and the control unit 21 may output collectively the calculation results at all of the steps upon completion of the calculations at all of the steps.

The control unit 21 determines whether all of the steps are completed depending on whether the condition for the final state is met (step S110). When all of the steps are not completed (step S110: No), the control unit 21 selects a section to be analyzed from the grid, as a selected section. Then, the control unit 21 outputs the water level $\eta$, the flow rate M, and the flow rate N at the current step in the selected section to the water level calculation unit 22 and the flow rate calculation unit 23, instructs for calculation at the next step, and then returns to step S102.

In contrast, when all of the steps are completed (step S110: Yes), the control unit 21 terminates the process of two-dimensional propagation calculation.

Figure 13:
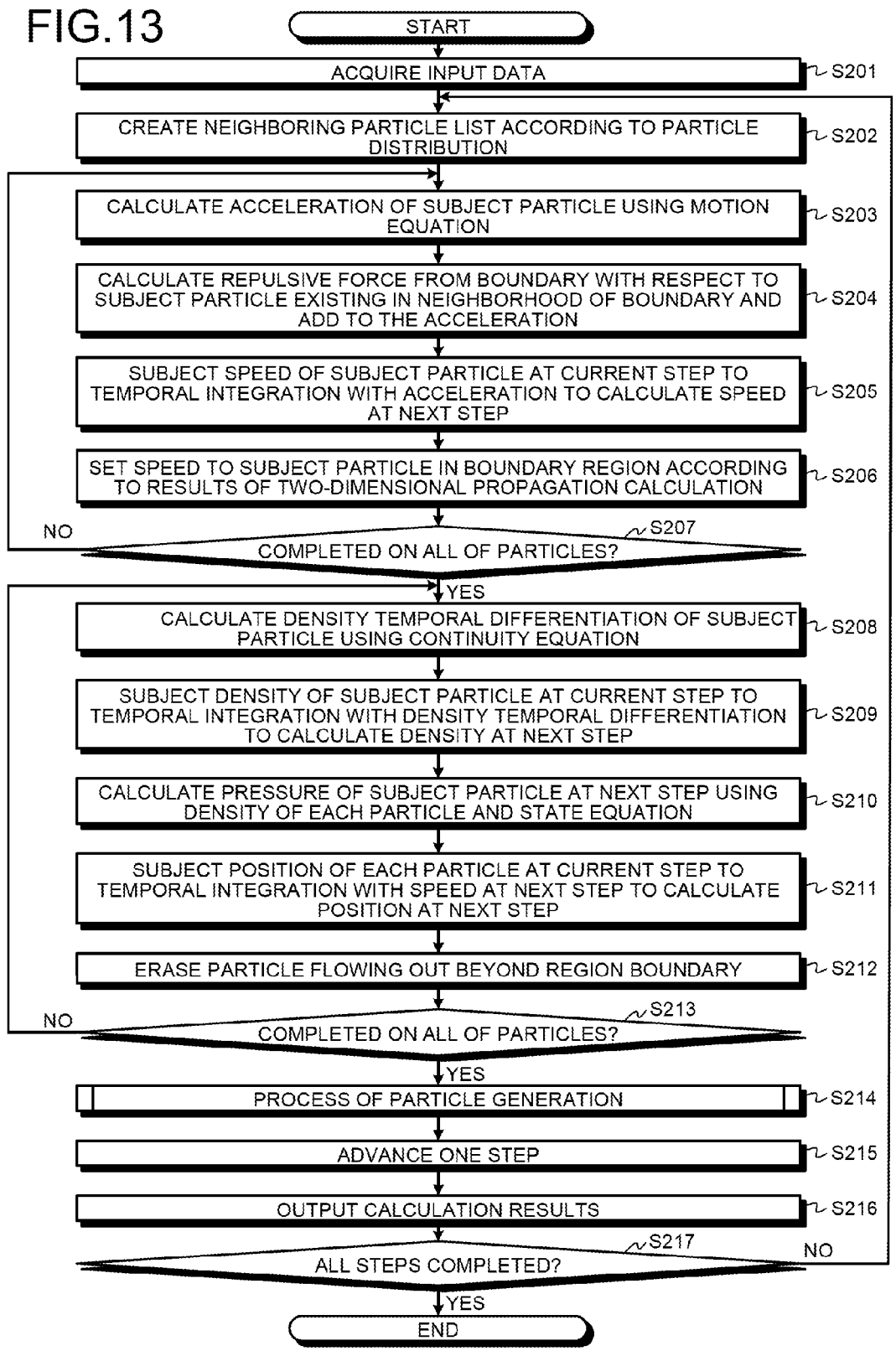
FIG. 13 is a flowchart of a process of a three-dimensional SPH calculation according to the second embodiment.

Next, a process of the three-dimensional SPH calculation according to the second embodiment will be described with reference to FIG. 13. FIG. 13 is a flowchart of the process of the three-dimensional SPH calculation according to the second embodiment.

The control unit 31 acquires input data on the water level $\eta$, the flow rate in the x direction M, and the flow rate in the y direction N in each section of the grid at each step, from the two-dimensional propagation calculation processor 2 (step S201). Then, the control unit 31 identifies a step at which the condition for starting the three-dimensional particle method calculation, and acquires the water level $\eta$, the flow rate in the x direction M, and the flow rate in the y direction N at the specified step. The control unit 31 further determines position coordinates to be used in the three-dimensional particle method calculation by interpolation. Then, the control unit 31 arranges particles according to overall water depth at the determined position coordinates, and sets the initial values of speed, density, pressure, and position of each particle.

The control unit 31 also creates a neighboring particle list according to a particle distribution (step S202). Then, the control unit 31 selects a subject particle, and outputs the density ρ, the pressure P, and the position r of the subject particle to the speed calculation unit 32. The control unit 31 also outputs the density ρ of the subject particle to the density calculation unit 33. In addition, the control unit 31 outputs the speed v of the subject particle to the position calculation unit 35.

The speed calculation unit 32 receives an input of the density ρ, the pressure P, and the position r of the subject particle from the control unit 31. Then, the speed calculation unit 32 substitutes the density ρ, the pressure P, and the position r of the subject particle into the equation of motion expressed by Equation (8) to calculate the acceleration dv/dt of the subject particle (step S203).

The speed calculation unit 32 further calculates a repulsive force from the boundary with respect to the subject particle using Equation (12). When there is no subject particle in the neighborhood of the boundary, the repulsive force is 0. Then, the speed calculation unit 32 adds the calculated repulsive force to the acceleration dv/dt (step S204) to calculate the acceleration v'.

The speed calculation unit 32 subjects the speed v of the subject particle at the current step to temporal integration with the acceleration v' at the current step using Equation (13) to calculate the speed v at the next step (step S205). Then, the speed calculation unit 32 outputs the calculated speed v of the subject particle at the next step to the control unit 31.

When there is the subject particle in the boundary region, the control unit 31 calculates the speed v of the subject particle from the results of the two-dimensional propagation calculation, and sets the calculated speed v as the speed of the subject particle, instead of the speed v input from the speed calculation unit 32 (step S206).

The control unit 31 determines whether the calculation of a speed is completed on all of the particles existing in the region 100 (step S207). When the calculation is not completed on all of the particles (step S207: No), the control unit 31 selects a subject particle from the particles on which no calculations have been performed, and then returns to step S203.

When the calculation is completed on all of the particles (step S207: Yes), the control unit 31 selects a subject particle, and instructs the density calculation unit 33, the pressure calculation unit 34, the position calculation unit 35 to perform calculations, and then moves to step S208.

The density calculation unit 33 substitutes the data on the speed v of the subject particle at the next step received from the speed calculation unit 32 into the continuity equation of Equation (14) to calculate the density temporal differentiation dρ/dt (step S208).

Next, the density calculation unit 33 substitutes the data on the density ρ of the subject particle at the current step received from the control unit 31 and the calculated value of the density temporal differentiation dρ/dt into Equation (15). Then, the density calculation unit 33 subjects the density ρ of the subject particle at the current step to integration with the density temporal differentiation dρ/dt to calculate the density ρ at the next step (step S209). The density calculation unit 33 outputs the calculated density ρ at the next step to the control unit 31.

The pressure calculation unit 34 substitutes the data on the density ρ at the next step received from the density calculation unit 33 into the equation as Equation (16) to calculate the pressure P at the next step (step S210). The pressure calculation unit 34 outputs the calculated pressure P at the next step to the control unit 31.

The position calculation unit 35 uses Equation (17) to subject the position r at the current step to temporal integration with the data on the speed v at the next step received from the speed calculation unit 32 to determine the position r at the next step (step S211). The position calculation unit 35 outputs the calculated position r at the next step to the control unit 31.

The control unit 31 uses the position r at the next step to identify particles flowing out across the region boundary, and erases the identified particles from the region 100 (step S212).

The control unit 31 determines whether the calculations of density, pressure, and position are completed on all of the particles existing in the region 100 (step S213). When the calculations are not completed on all of the particles (step S213: No), the control unit 31 selects a subject particle from the particles on which no calculations have been performed, and then returns to step S208.

In contrast, when the calculations are completed on all of the particles (step S213: Yes), the control unit 31 instructs the particle generation unit 36 to generate particles. The particle generation unit 36 determines the current outflow or inflow volume of sea water based on the speed determined by the two-dimensional propagation calculation at the position of each particle generator, and then performs a process of generating particles (step S214). The flow of the process of generating particles will be described below in detail. Then, the particle generation unit 36 notifies the positions of the particles the generation of which is decided, to the control unit 31.

The control unit 31 advances one analysis step (step S215).

The control unit 21 then outputs the results of the calculation at the current analysis step to the result storage unit 4 (step S216). In this flowchart, the control unit 31 outputs the calculation results upon completion of the calculation at each step, but the present invention is not limited to this, and the control unit 31 may output collectively the calculation results at all of the steps upon completion of the calculations at all of the steps.

The control unit 31 determines whether all of the steps are completed depending on whether the condition for the final state is met (step S217). When all of the steps are not completed (step S217: No), the control unit 31 returns to step S202.

In contrast, when all of the steps are completed (step S217: Yes), the control unit 31 terminates the process of the three-dimensional SPH calculation.

Figure 14:
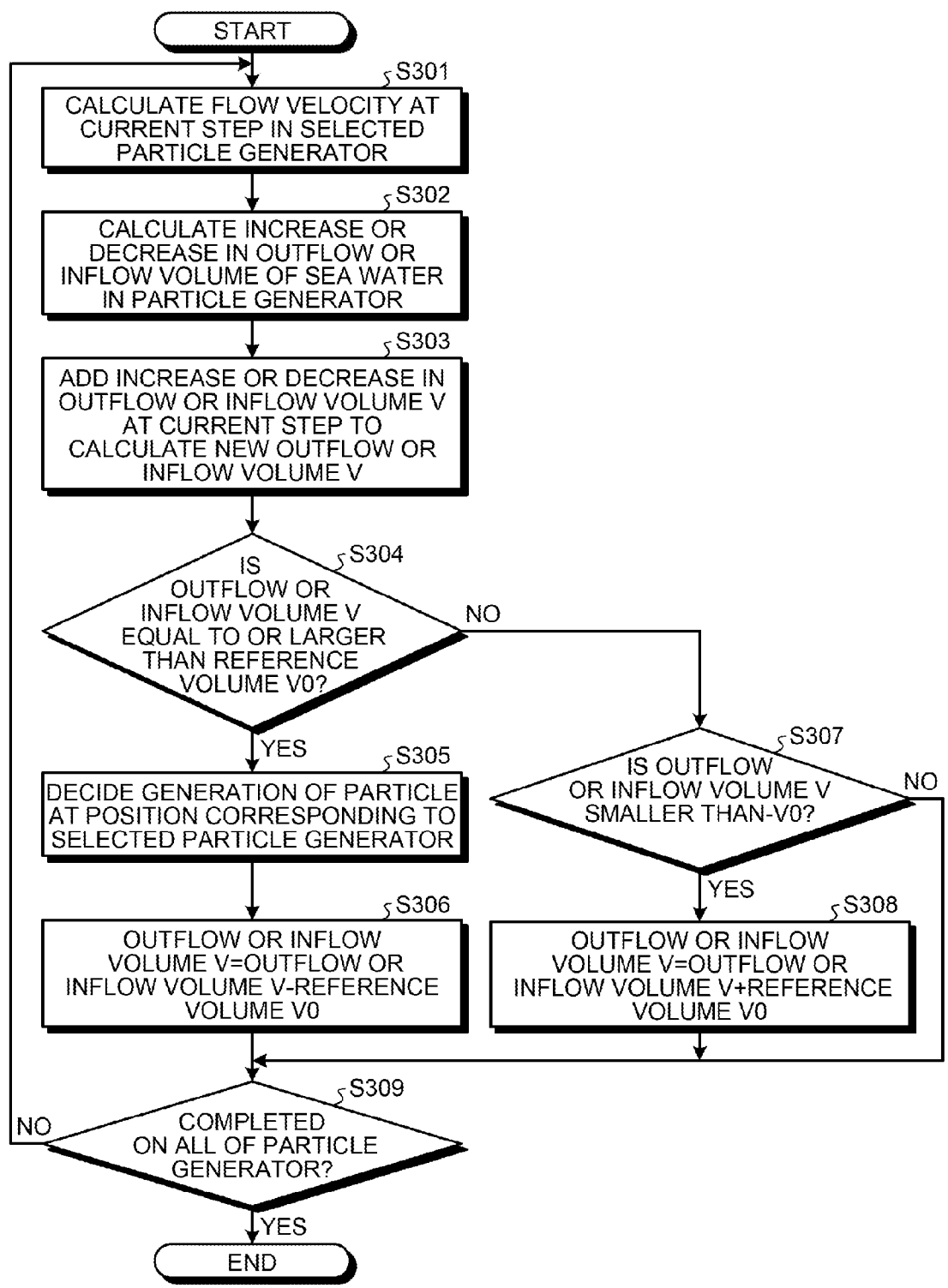
FIG. 14 is a flowchart of a process of the three-dimensional SPH calculation according to the second embodiment.

Next, the process of the three-dimensional SPH calculation according to the second embodiment will be described with reference to FIG. 14. FIG. 14 is a flowchart of the process of the three-dimensional SPH calculation according to the second embodiment. The flowchart of FIG. 14 corresponds to the step S215 in the flowchart of FIG. 13.

The particle generation unit 36 selects a particle generator. The particle generation unit 36 then calculates the flow velocity of sea water at the current step in the selected particle generator (step S301).

Next, the particle generation unit 36 calculates an increase or a decrease in the outflow or inflow volume of sea water in the selected particle generator, from the flow velocity of sea water and the area of the particle generator (step S302).

Next, the particle generation unit 36 adds the increase or the decrease to an outflow or inflow volume V at the current step to calculate a new outflow or inflow volume V at the current step (step S303).

Next, the particle generation unit 36 determines whether the new outflow or inflow volume V is equal to or larger than a reference volume $V_0$ (step S304). When the new volume V is equal to or more than the reference volume (step S304: Yes), the particle generation unit 36 decides to generate a particle at the position corresponding to the selected particle generator (step S305).

Next, the particle generation unit 36 subtracts the reference volume $V_0$ from the new outflow or inflow volume V at the current step to calculate the outflow or inflow volume V at the next step (step S306).

In contrast, when the new outflow or inflow volume V is equal to or more than the reference volume $V_0$ (step S304: No), the particle generation unit 36 determines whether the new outflow or inflow volume V is smaller than a negative value of the reference volume $V_0$, that is, $-V_0$ (step S307). When the new volume V is smaller than $-V_0$ (step S307: Yes), the particle generation unit 36 adds the reference volume $V_0$ to the new outflow or inflow volume V at the current step to calculate the outflow or inflow volume V at the next step (step S308). In contrast, when the new outflow or inflow volume V is larger than $-V_0$ (step S307: No), the particle generation unit 36 moves to step S309.

The particle generation unit 36 then determines whether the process of generating particles is completed on all of the particle generators (step S309). When there is any particle generator on which the process of generating particles has not been completed (step S309: No), the particle generation unit 36 returns to step S301.

In contrast, when the process of generating particles is completed on all of the particle generators (step S309: Yes), the particle generation unit 36 terminates the process of generating particles.

As described above, in simulation on a wide-area movement of a continuum, the simulation apparatus according to the second embodiment performs the two-dimensional propagation calculation in wider areas and performs the three-dimensional particle method calculation in areas under larger influence of three-dimensional forms such as port areas and urban areas. In addition, the simulation apparatus according to the embodiment performs the two-dimensional propagation calculation and the three-dimensional particle method calculation using the foregoing equations and the like. Accordingly, it is possible to perform calculations without a failure even on events with a movement of a large amount of fluid such as a tsunami, and conduct simulation with a high accuracy while suppressing a calculation amount.

In addition, the simulation apparatus according to the second embodiment makes it possible to keep the width of the boundary region at the same level as the influence radius of the particle and to suppress the calculation amount in a reliable manner.

It is further possible to set the particle generators so as to be oriented in a three-dimensional space. Accordingly, it is possible to set the arbitrary shape of the boundary in the two-dimensional propagation calculation and the three-dimensional particle method calculation, thereby improving the degree of freedom for the conditions for simulation.

[c] Third Embodiment

Next, a third embodiment will be described. The simulation apparatus according to the third embodiment is different from those in the first and second embodiments, in that the three-dimensional particle method calculation is performed in parallel with the two-dimensional propagation calculation in the middle of the two-dimensional propagation calculation without completing the two-dimensional propagation calculation. Descriptions of the components having the same functions as those of the first and second embodiments are not repeated below.

A two-dimensional propagation calculation processor 2 outputs the calculation results at each step to a three-dimensional SPH calculation processor 3 at completion of each step.

Upon receipt of the calculation results, the three-dimensional SPH calculation processor 3 determines whether a condition for starting the three-dimensional particle method calculation is met, based on the calculation results received so far.

When the condition for starting the three-dimensional particle method calculation is met, the three-dimensional SPH calculation processor 3 generates initial conditions of a position and a speed of each particle, from the received data on the water level and the flow rate of the calculation results. The three-dimensional SPH calculation processor 3 further uses a general density and a pressure of sea water as initial conditions of the density and the pressure of each particle.

The three-dimensional SPH calculation processor 3 then performs the three-dimensional particle method calculation using the speed, the density, the pressure, and the position at step #n to calculates the speed, the density, the pressure, and the position at step #n+1.

After the calculation of the speed, the density, the pressure, and the position at step #n+1, the three-dimensional SPH calculation processor 3 determines whether the condition for the boundary at step #n+2, that is, the speed of particles existing in the boundary region can be determined.

When the boundary conditions can be determined, the three-dimensional SPH calculation processor 3 uses the speed, the density, the pressure, and the position at step #n+1 and the boundary conditions to calculate the speed, the density, the pressure, and the position at step #n+2.

In contrast, when the boundary conditions are not determined, the three-dimensional SPH calculation processor 3 acquires the results at the next step of the two-dimensional propagation calculation, from the two-dimensional propagation calculation processor 2. After that, the three-dimensional SPH calculation processor 3 determines the boundary conditions based on the acquired results at the next step of the two-dimensional propagation calculation. Then, the three-dimensional SPH calculation processor 3 uses the speed, the density, the pressure, and the position at step #n+1 and the boundary conditions to calculate the speed, the density, the pressure, and the position at step #n+2.

Figure 15:
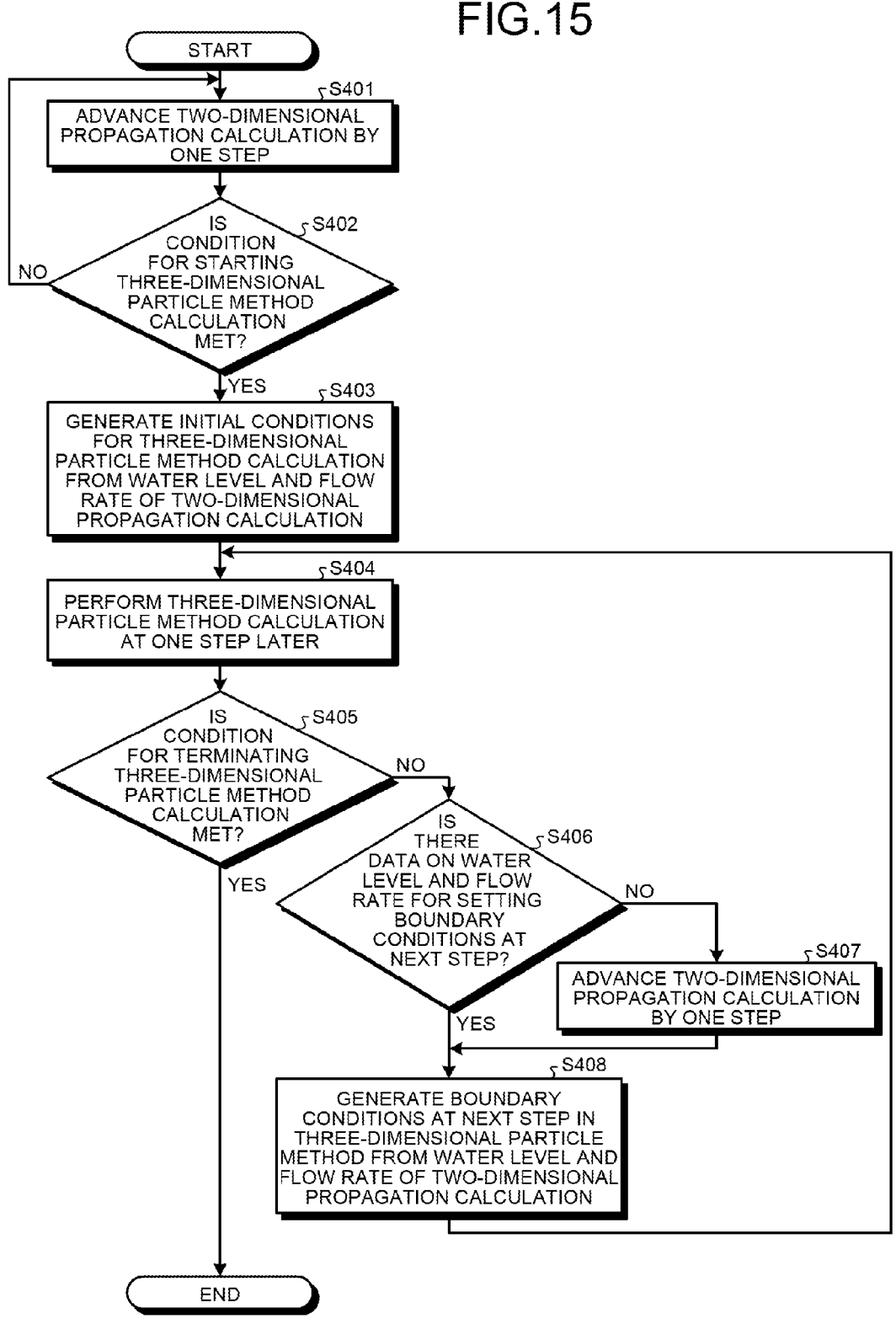
FIG. 15 is a flowchart of an analysis process performed by the simulation apparatus according to a third embodiment.

The entire flows of the processes of the two-dimensional propagation calculation and the three-dimensional particle method calculation will be described with reference to FIG. 15. FIG. 15 is a flowchart of the analysis process performed by the simulation apparatus according to the third embodiment.

The two-dimensional propagation calculation processor 2 advances the two-dimensional propagation calculation by one step (step S401). The two-dimensional propagation calculation processor 2 then outputs the calculation results at the current step to the three-dimensional SPH calculation processor 3.

The three-dimensional SPH calculation processor 3 determines whether the condition for starting the three-dimensional particle method calculation is met, based on the results of the two-dimensional propagation calculation received so far (step S402). For example, the three-dimensional SPH calculation processor 3 stores the water level exceeding 50 cm at the boundary in the region 100 as a condition for starting the three-dimensional particle method calculation. When the condition for starting the three-dimensional particle method calculation is not met (step S402: No), the two-dimensional propagation calculation processor 2 returns to step S401.

In contrast, when the condition for starting the three-dimensional particle method calculation is met (step S402: Yes), the three-dimensional SPH calculation processor 3 generates initial conditions of a position and a speed in the three-dimensional particle method calculation, from the water level and the flow rate by the two-dimensional propagation calculation (step S403).

The three-dimensional SPH calculation processor 3 then performs the three-dimensional particle method calculation to obtain the speed, the density, the pressure, and the position of each particle at one step later (step S404).

After that, the three-dimensional SPH calculation processor 3 determines whether the condition for terminating the three-dimensional particle method calculation is met, based on the calculation results up to the current step (step S405).

When the condition for terminating the three-dimensional particle method calculation is not met (step S405: No), the three-dimensional SPH calculation processor 3 determines whether there is data on the water level and the flow rate from the two-dimensional propagation calculation for setting the boundary conditions at the next step (step S406).

When there exist no data on the water level and the flow rate from the two-dimensional propagation calculation for setting the boundary conditions at the next step (step S406: No), the two-dimensional propagation calculation processor 2 advances the two-dimensional propagation calculation by one step (step S407). Then, the two-dimensional propagation calculation processor 2 outputs the calculation results at the current step to the three-dimensional SPH calculation processor 3.

In contrast, when there is any data on the water level and the flow rate for setting the boundary conditions at the next step (step S406: Yes), the three-dimensional SPH calculation processor 3 moves to step S408.

The three-dimensional SPH calculation processor 3 then generates the boundary conditions at the next step in the three-dimensional particle method calculation, from the water level and the flow rate from the two-dimensional propagation calculation (step S408). After that, the three-dimensional SPH calculation processor 3 returns to step S404.

On the other hand, when the condition for terminating the three-dimensional particle method calculation is met (step S405: Yes), the three-dimensional SPH calculation processor 3 terminates the three-dimensional particle method calculation.

In the foregoing description with reference to FIG. 15, the two-dimensional propagation calculation is performed after the results of the two-dimensional propagation calculation are requested in the three-dimensional particle method calculation. Alternatively, the two-dimensional propagation calculation processor 2 may start the two-dimensional propagation calculation regardless of the status of progress of the three-dimensional particle method calculation.

As described above, the simulation apparatus according to the third embodiment starts the three-dimensional particle method calculation without waiting for the termination of the two-dimensional propagation calculation, and performs the two-dimensional propagation calculation and the three-dimensional particle method calculation in parallel. In this case, for example, a computer for performing the two-dimensional propagation calculation and a computer for performing the three-dimensional particle method calculation can be separated. The computer for performing the three-dimensional particle method calculation can execute the three-dimensional particle method calculation using a file of results of the two-dimensional propagation calculation output from the computer for performing the two-dimensional propagation calculation. This makes it possible to reduce the entire calculation time.

The various processes described above in relation to the foregoing embodiments can be realized by executing prepared programs by a computer. One example of a computer executing a simulation program having the same functions as those of the simulation apparatus illustrated in FIG. 1 will be described below with reference to FIG. 16.

Figure 16:
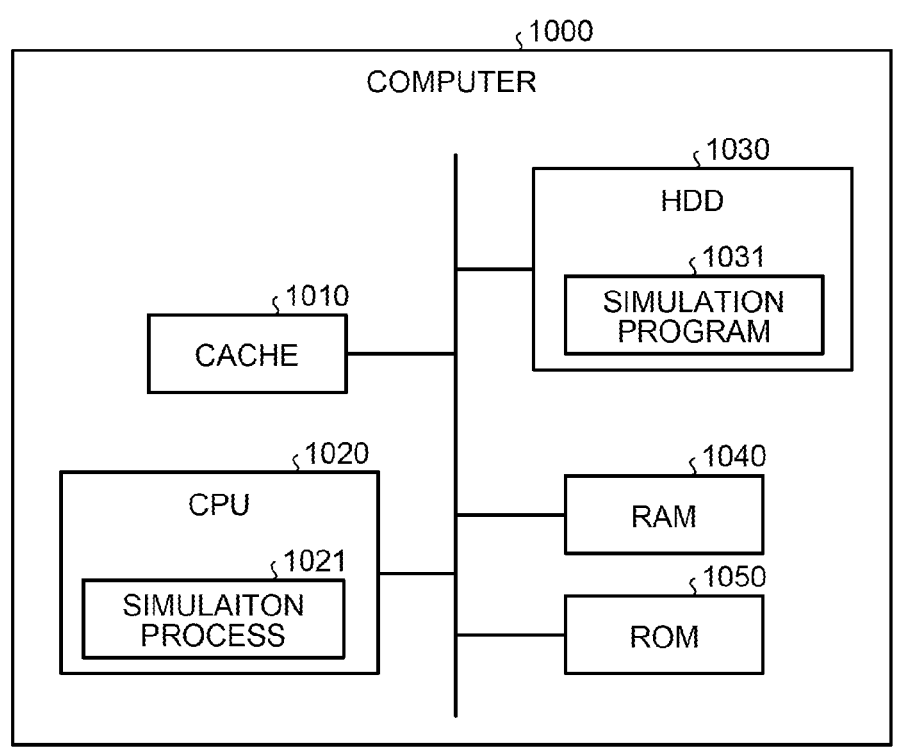
FIG. 16 is a diagram illustrating a computer executing a simulation program.

FIG. 16 is a diagram for illustrating a computer executing the simulation program. As illustrated in FIG. 16, a computer 1000 has a cache 1010, a CPU (central processing unit) 1020, an HDD (hard disk drive) 1030, a RAM (random access memory) 1040, and a ROM (read only memory) 1050. The cache 1010, the CPU 1020, the HDD 1030, the RAM 1040, and the ROM 1050 are connected by a bus.

The HDD 1030 stores, in advance, various simulation programs 1031 exercising the same functions as those in the simulation apparatus illustrated in FIG. 1.

The CPU 1020 reads and executes the simulation programs 1031. Accordingly, as illustrated in FIG. 16, the simulation programs 1031 become simulation processes 1021.

The foregoing simulation programs 1031 are not necessarily stored in the HDD 1030. For example, the simulation programs 1031 may be stored in "portable physical media" such as a flexible disk, a CD (compact disk)-ROM, a DVD (digital versatile disk), an optical magnetic disk, and an IC (integrated circuit) card. Alternatively, the simulation program 1031 may be stored in "fixed physical media" such as a hard disc drive (HDD) provided inside or outside the computer 1000. Alternatively, the simulation program 1031 may be stored in "another computer (or server)" connected to the computer 1000 via a public line, the Internet, a LAN (local area network), a WAN (wide area network), and the like. In addition, the computer 1000 may read and execute each of the programs from the foregoing flexible disk or the like.

According to an embodiment of a simulation program, a simulation method, and a simulation apparatus disclosed herein, it is possible to allow advantageously accurate simulation of movement of a continuum.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a simulation program causing a computer to execute a process comprising:

calculating a flow rate and a water level of a continuum at each grid point in a grid which is generated by dividing a two-dimensional plane as a planar view of a first region into predetermined sections, on the basis of input data;

expressing the continuum in a second region contained in the first region as an assembly of particles; and subjecting a state of the each particle to a three-dimensional analysis based on the calculated flow rate and water level.

2. The non-transitory computer-readable recording medium according to claim 1, wherein the process further comprises:

generating an initial condition and a boundary conditions on the basis of the calculated flow rate and water level; and analyzing the state of the each particle on the basis of the generated initial condition and the boundary conditions.

3. The non-transitory computer-readable recording medium according to claim 1, wherein the process further comprises:

receiving an input of initial values of the flow rate and water level of a continuum at each grid point on a two-dimensional plane in the first region;

calculating temporal differentiation of a water level at the current step at the each grid point, and subjecting the water level at the current step to temporal integration on the basis of the calculated temporal differentiation of the water level to calculate a water level at the next step;

calculating temporal differentiation of a flow rate at the current step at the each grid point, and subjecting the flow rate at the current step to temporal integration on the basis of the calculated temporal differentiation of the flow rate to calculate a flow rate at the next step; and repeating the calculation of the water level and the flow rate at the next step until a first predetermined step is reached.

4. The non-transitory computer-readable recording medium according to claim 1, wherein the process further comprises:

calculating an acceleration at the current step for the each particle according to an equation of motion, and subjecting a speed at the current step to temporal integration according to the calculated acceleration to calculate a speed at the next step;

calculating temporal differentiation of a density at the current step for the each particle according to a continuity equation, and subjecting the density at the current step to the temporal integration according to the calculated temporal differentiation of the density to calculate a density at the next step;

calculating a pressure at the next step for the each particle using a equation according to the calculated density at the next step;

subjecting a position coordinate at the current step for the each particle to temporal integration with the calculated speed at the next step to calculate a position coordinate at the next step; and repeating the calculation of a speed, a density, a pressure, and a position coordinate at the next step until a second predetermined step is reached to analyze the state of the each particle.

5. The non-transitory computer-readable recording medium according to claim 1, wherein the process further comprises:

using a speed of a continuum at each grid point on the two-dimensional plane in the first region as a speed of the particle existing at a region boundary at a specific distance from a boundary in the second region.

6. The non-transitory computer-readable recording medium according to claim 1, wherein the process further comprises:

erasing a particle flowing out across a region boundary at a specific distance from a boundary in the second region;

when a volume of the continuum flowing into the region boundary exceeds a predetermined volume, generating new particles to analyze the state of the particles.

7. A simulation method comprising:

calculating a flow rate and a water level of a continuum at each grid point in a grid which is generated by dividing a two-dimensional plane as a planar view of a first region into predetermined sections, on the basis of input data;

expressing the continuum in a second region contained in the first region as an assembly of particles;

subjecting a state of the each particle to a three-dimensional analysis based on the calculated flow rate and water level; and storing results of the analysis in a memory.

8. A simulation apparatus comprising:

a two-dimensional analysis processor that determines a flow rate and a wave height of a continuum at each grid point in a grid which is generated by dividing a two-dimensional plane as a planar view of a first region into predetermined sections, on the basis of input data;

a three-dimensional analysis processor that performs a three-dimensional analysis on a second region contained in the first region to analyze the state of each particle in expression of the continuum as an assembly of particles, on the basis of data calculated by the two-dimensional analysis processor.

* * * * *